US012622452B2

(12) United States Patent
Woo

(10) Patent No.: US 12,622,452 B2
(45) Date of Patent: May 12, 2026

(54) ROASTING APPARATUS AND CONTROLLING METHOD THEREOF

(71) Applicant: STRONGHOLD TECHNOLOGY, INC., Guemcheon-gu (KR)

(72) Inventor: Jong Wook Woo, Mapo-gu (KR)

(73) Assignee: Stronghold Technology, Inc., Seoul (KR)

( * ) Notice: Subject to any disclaimer, the term of this patent is extended or adjusted under 35 U.S.C. 154(b) by 912 days.

(21) Appl. No.: 17/931,673

(22) Filed: Sep. 13, 2022

(65) Prior Publication Data

US 2023/0101715 A1     Mar. 30, 2023

(30) Foreign Application Priority Data

Sep. 29, 2021   (KR) ........................ 10-2021-0128603
Jun. 13, 2022   (KR) ........................ 10-2022-0071632

(51) Int. Cl.
  *A23F 5/04*        (2006.01)
  *A23N 12/08*       (2006.01)
  *A23N 12/12*       (2006.01)
(52) U.S. Cl.
  CPC ......... *A23N 12/125* (2013.01); *A23N 12/083* (2013.01)
(58) Field of Classification Search
  CPC .... A23N 12/12; A23N 12/125; A23N 12/083; A23N 12/08; A23F 5/04
        (Continued)

(56) References Cited

U.S. PATENT DOCUMENTS

2015/0351421 A1   12/2015  Vetter
2019/0133377 A1    5/2019  McCullough
2019/0320703 A1*  10/2019  Sandhu ..................... A23F 5/04

FOREIGN PATENT DOCUMENTS

CN        105573114 A     5/2016
CN        109497111 A     3/2019
          (Continued)

OTHER PUBLICATIONS

European Patent Office, Extended European Search Report, EP-21137152, Jun. 19, 2023, Munich Germany.
        (Continued)

*Primary Examiner* — Deming Wan
(74) *Attorney, Agent, or Firm* — Sisson & Banyas, Attorneys at Law, LLC; Edwin A. Sisson

(57)          ABSTRACT

Disclosed herein are a roasting apparatus and a method of controlling a roasting apparatus, and more particularly, are a roasting apparatus in which an object is stirred and roasted in a roasting chamber, and a method of controlling the roasting apparatus.
The roasting apparatus for heating an object includes a roasting chamber part which includes a cylindrical roasting chamber, in which an object is stirred and which extends in a vertical direction, and a rotary stirring part rotated to stir the object accommodated in the roasting chamber, wherein the rotary stirring part is rotated about a stirring axis formed in the vertical direction; a casing unit configured to surround the roasting chamber part; a heat source part including a first heat source part configured to provide radiant heat to the roasting chamber part; and a radiant temperature measurement unit configured to measure a temperature of the roasting chamber or the object and a chamber outer space temperature of a chamber outer space between the casing unit and the roasting chamber part on the basis of infrared rays emitted from an inner surface of the roasting chamber part or a surface of the object, which is heated by the heat source part, wherein a preheating operation is performed until the chamber inner temperature of the roasting chamber and the chamber outer space temperature reach a preset reference chamber inner temperature and a preset reference chamber outer space temperature.

11 Claims, 15 Drawing Sheets

(58) Field of Classification Search
USPC ............ 34/233, 594; 99/468, 483, 331, 476,
99/323.7
See application file for complete search history.

(56)                    References Cited

FOREIGN PATENT DOCUMENTS

| | | | |
|---|---|---|---|
| EP | 0193025 | A2 | 9/1986 |
| EP | 3864970 | A1 | 8/2021 |
| JP | 2004105185 | A | 4/2004 |
| KR | 100342091 | B1 | 6/2002 |
| KR | 100369539 | B1 | 2/2003 |
| KR | 100463341 | B1 | 12/2004 |
| KR | 1020070096085 | A | 10/2007 |
| KR | 100804106 | B1 | 2/2008 |
| KR | 100887985 | B1 | 3/2009 |
| KR | 1020100038802 | A | 4/2010 |
| KR | 100963695 | B1 | 6/2010 |
| KR | 20200041268 | A | 4/2020 |
| WO | 2012115448 | A2 | 8/2012 |
| WO | 2020076041 | A1 | 4/2020 |

OTHER PUBLICATIONS

Bureau of the Korean Intellectual Property Office, Office Action
120110070525, Oct. 17, 2023.
Partial European Search Report for EP21137152, Feb. 7, 2023.
Korean Intellectual Property Office, 9-5-2024-003742716, Office
Action, Mar. 10, 2024, Seo-gu Daejoen.

* cited by examiner

[FIG. 1]
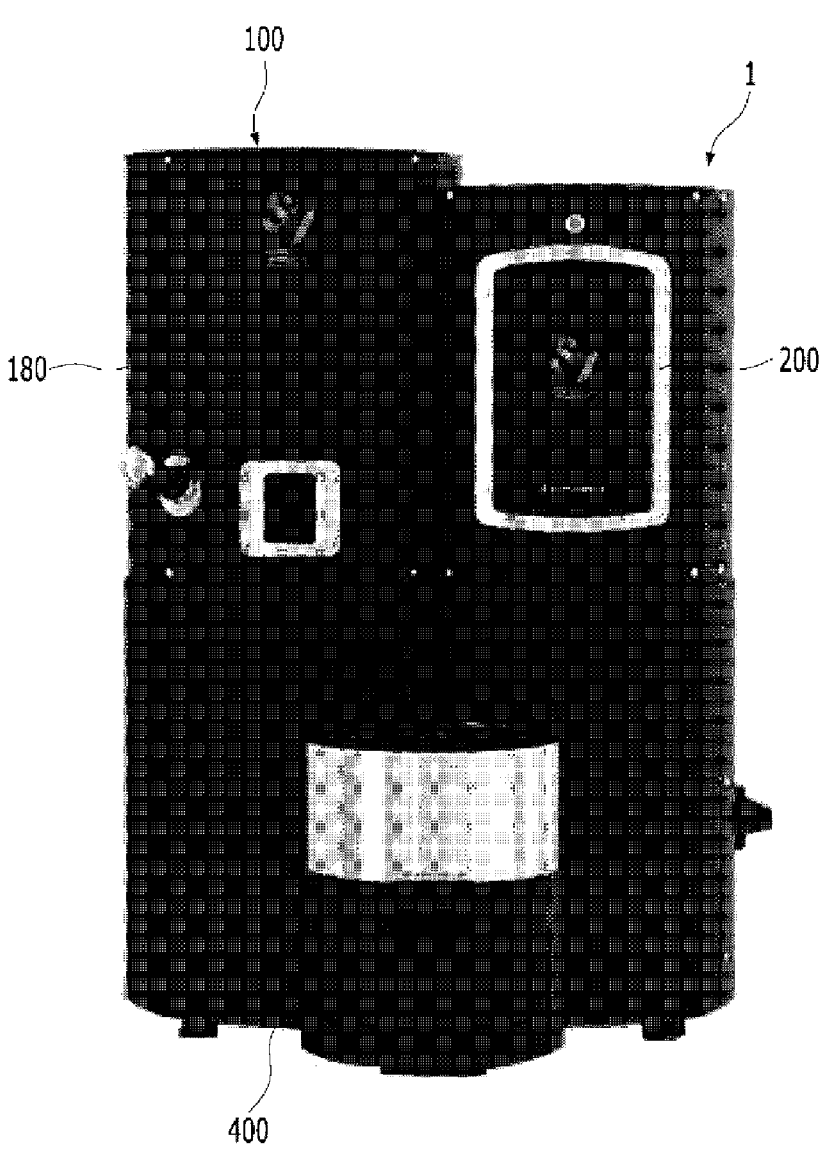

[FIG. 2]
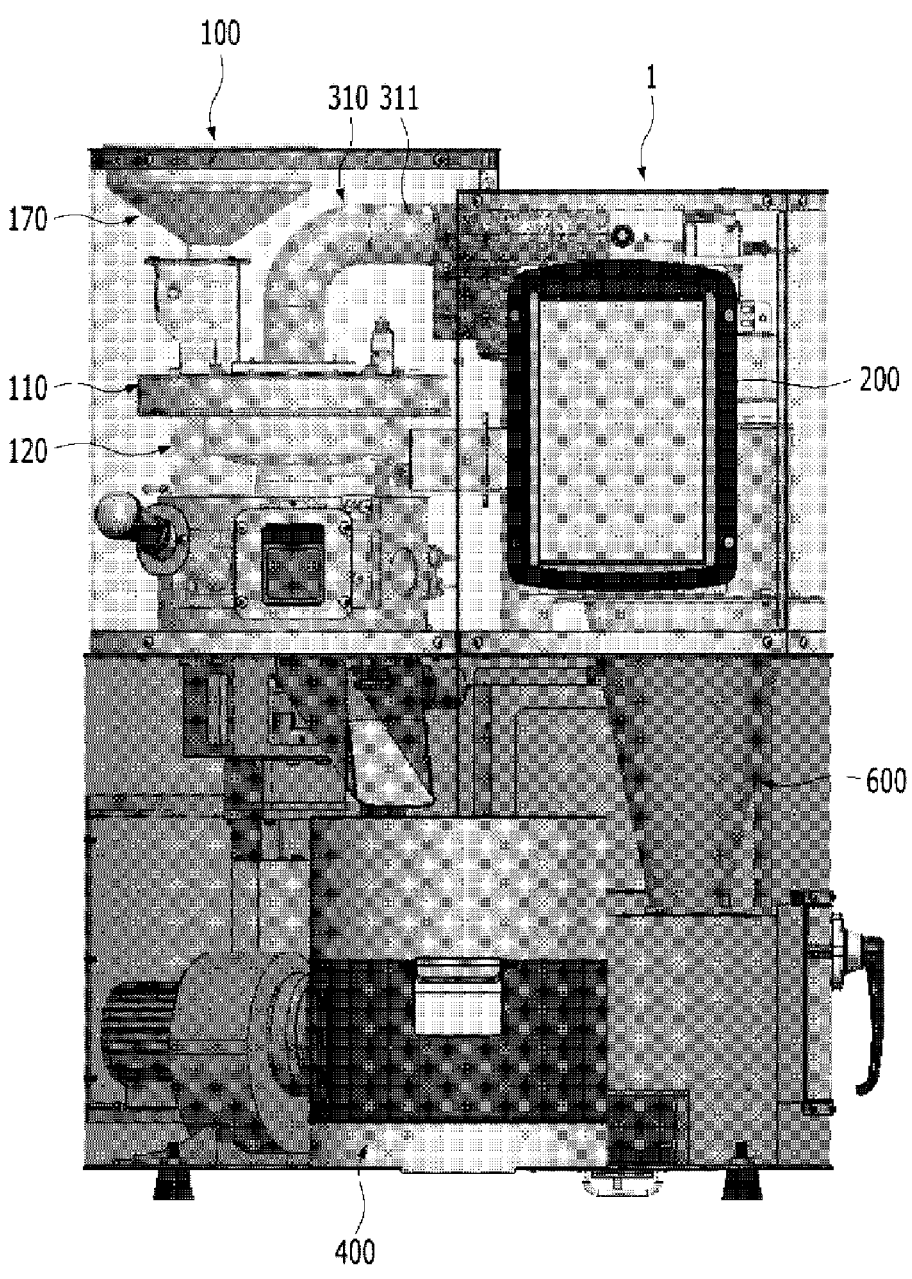

[FIG. 3]
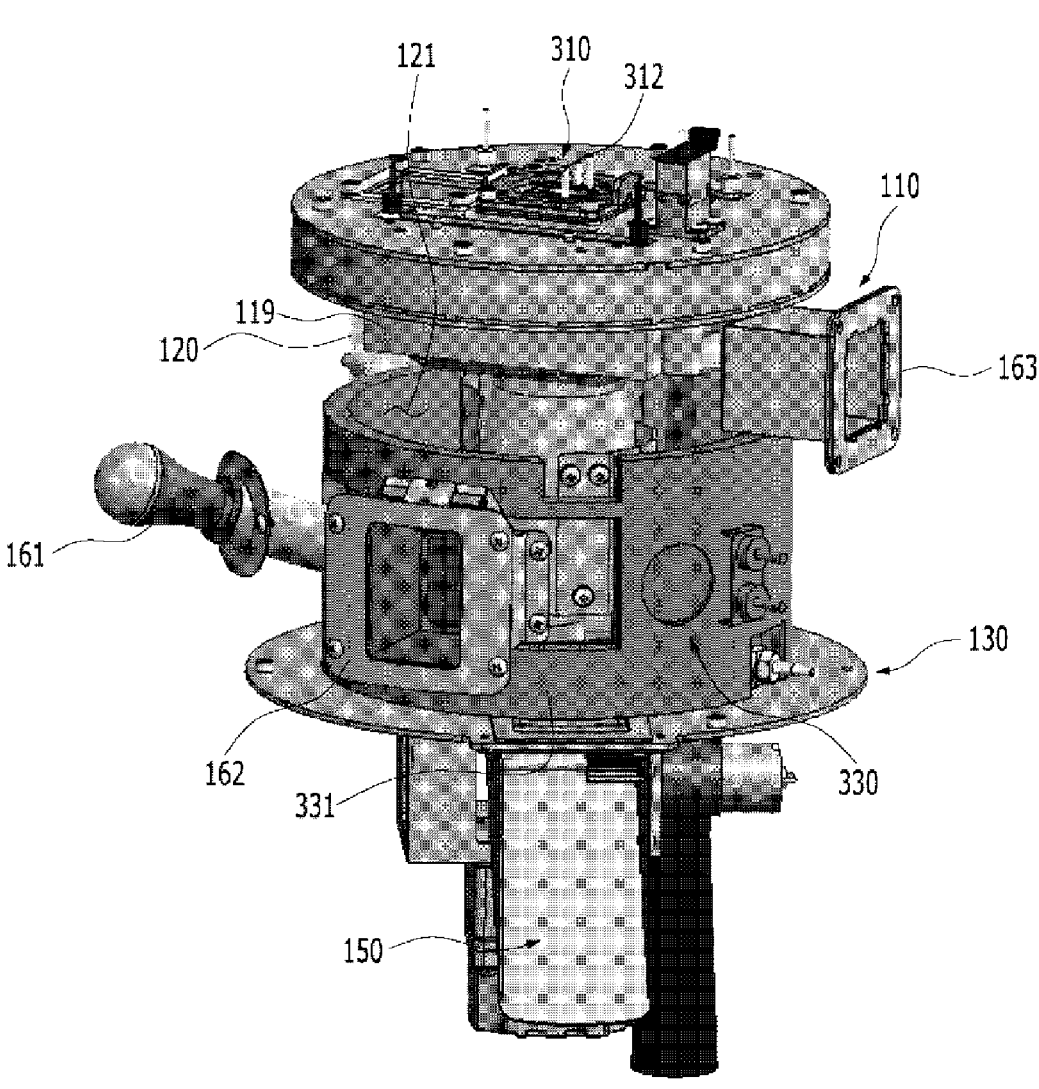

[FIG. 4]
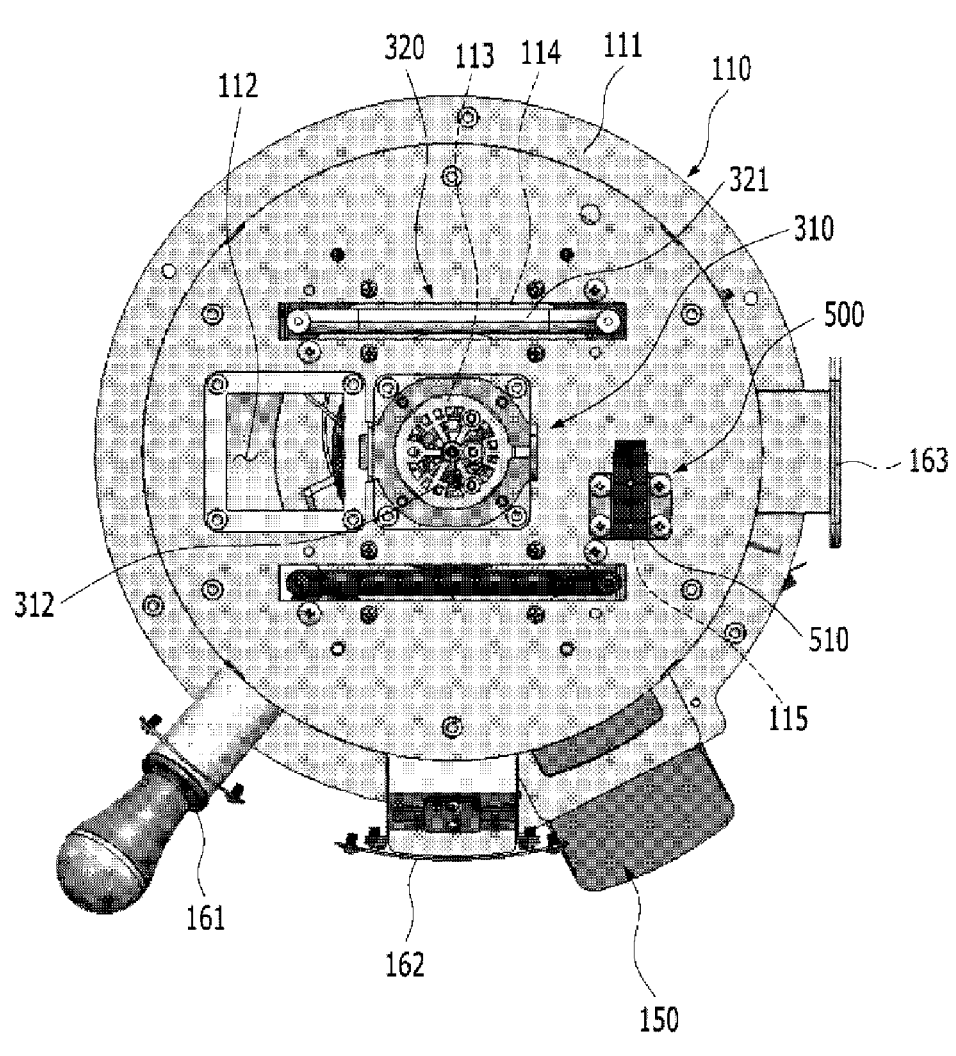

[FIG. 5]
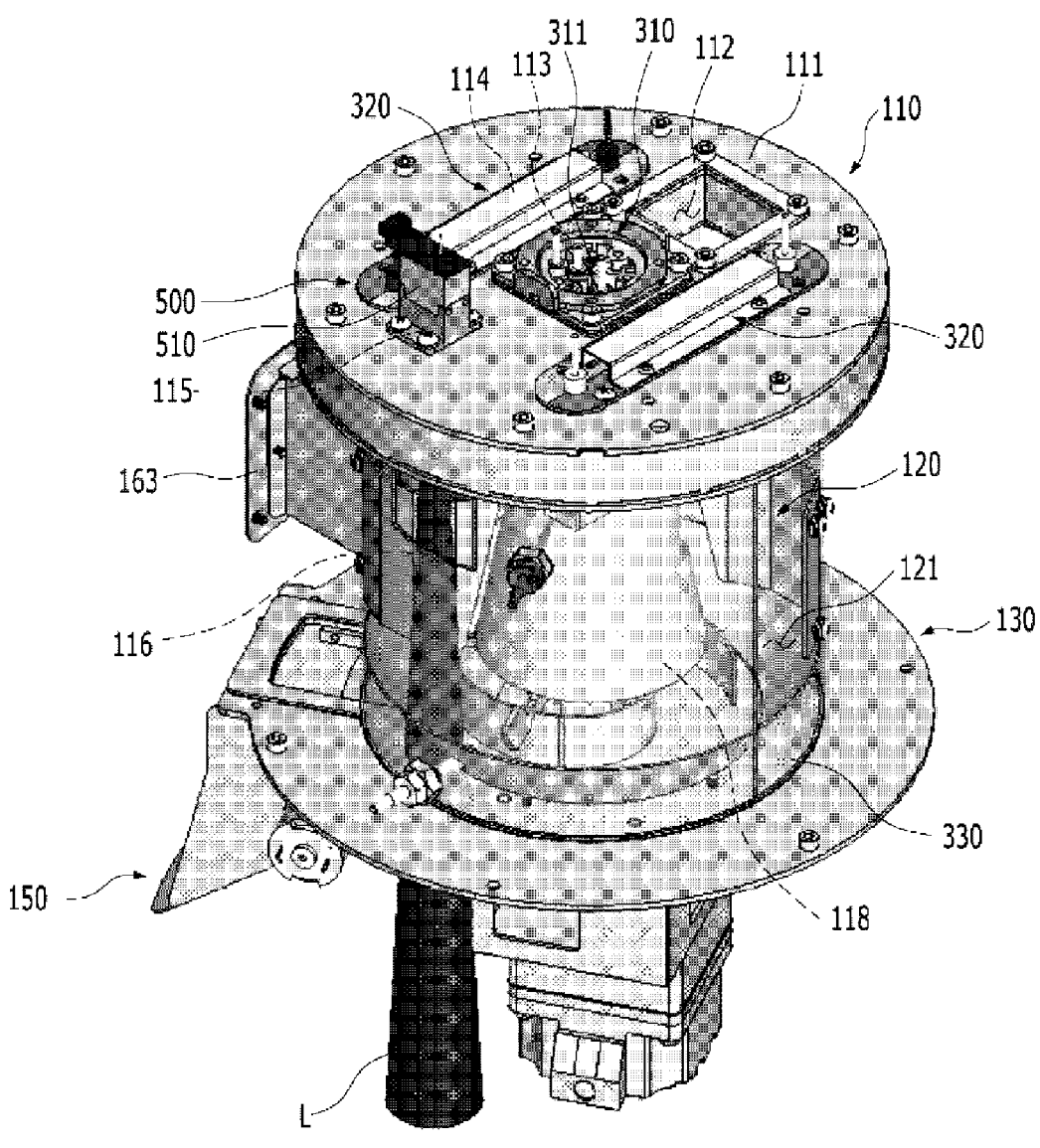

[FIG. 6]
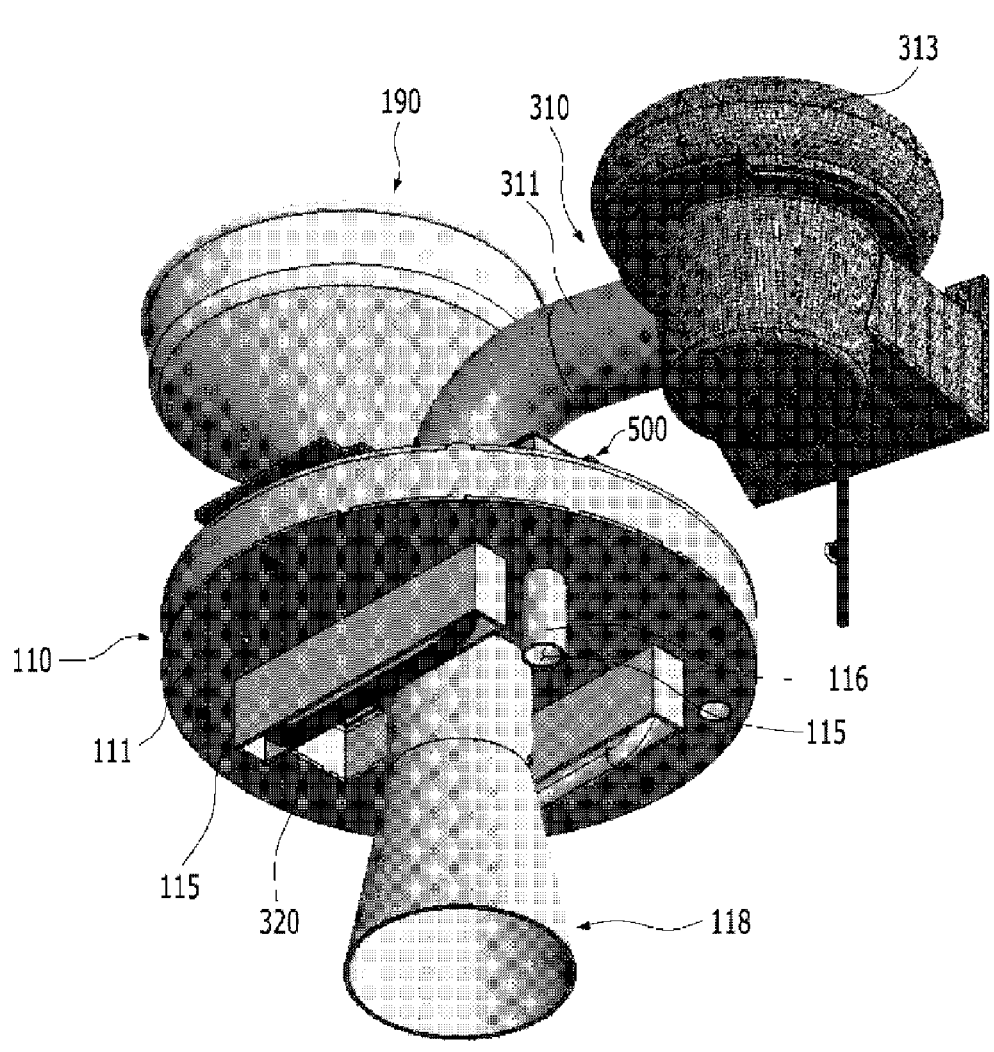

[FIG. 7]
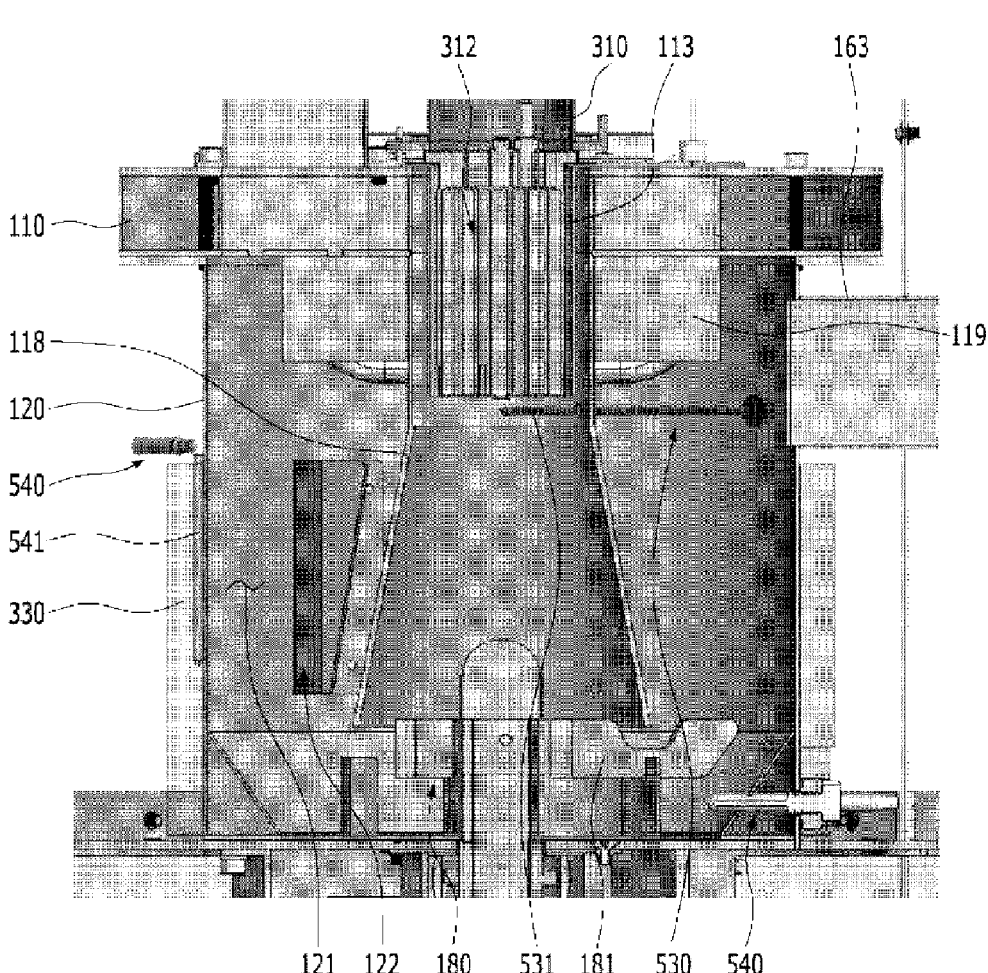

[FIG. 8]
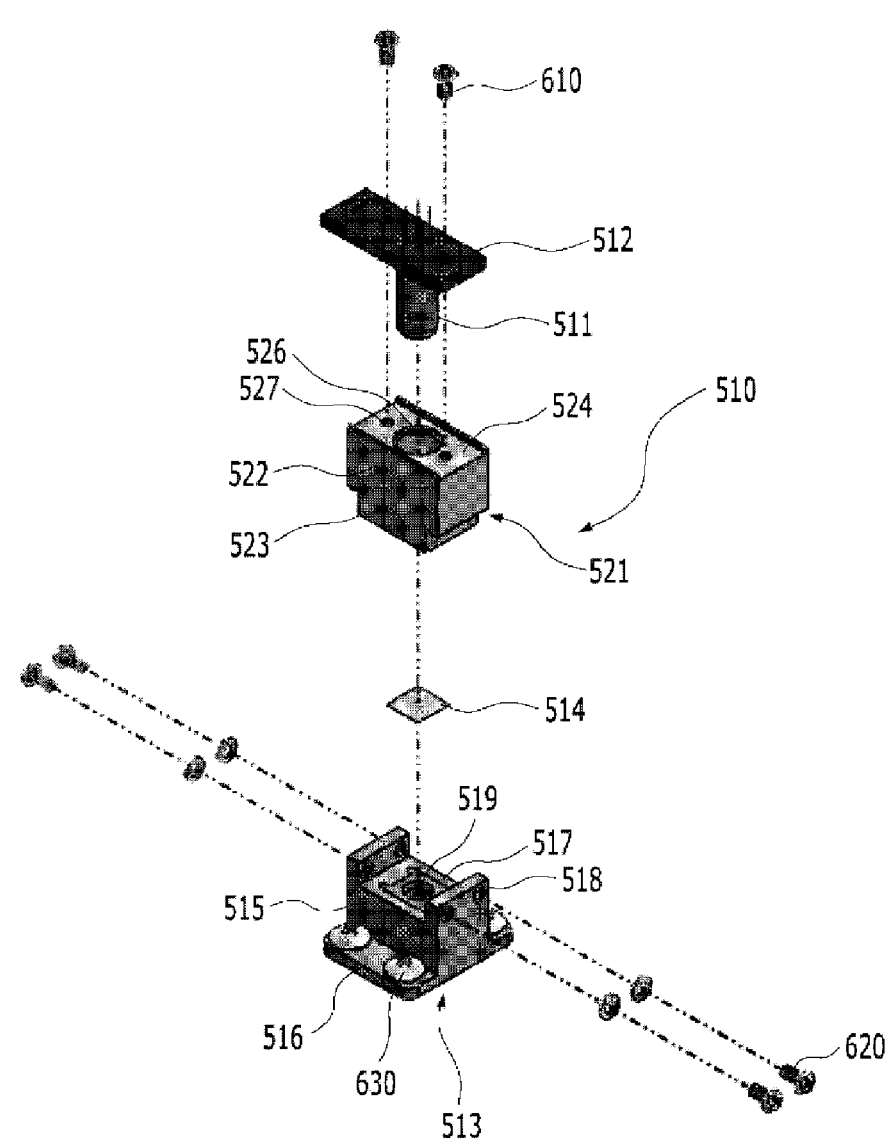

[FIG 9]
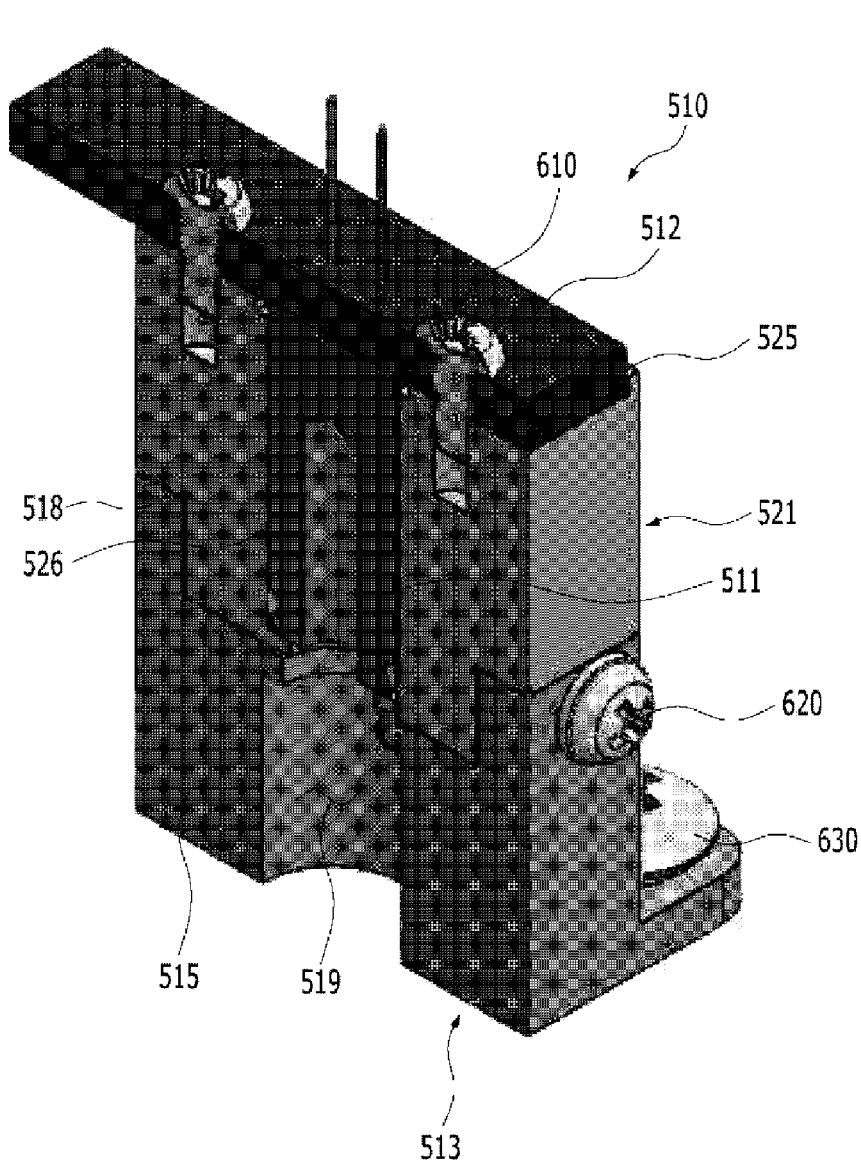

[FIG. 10]
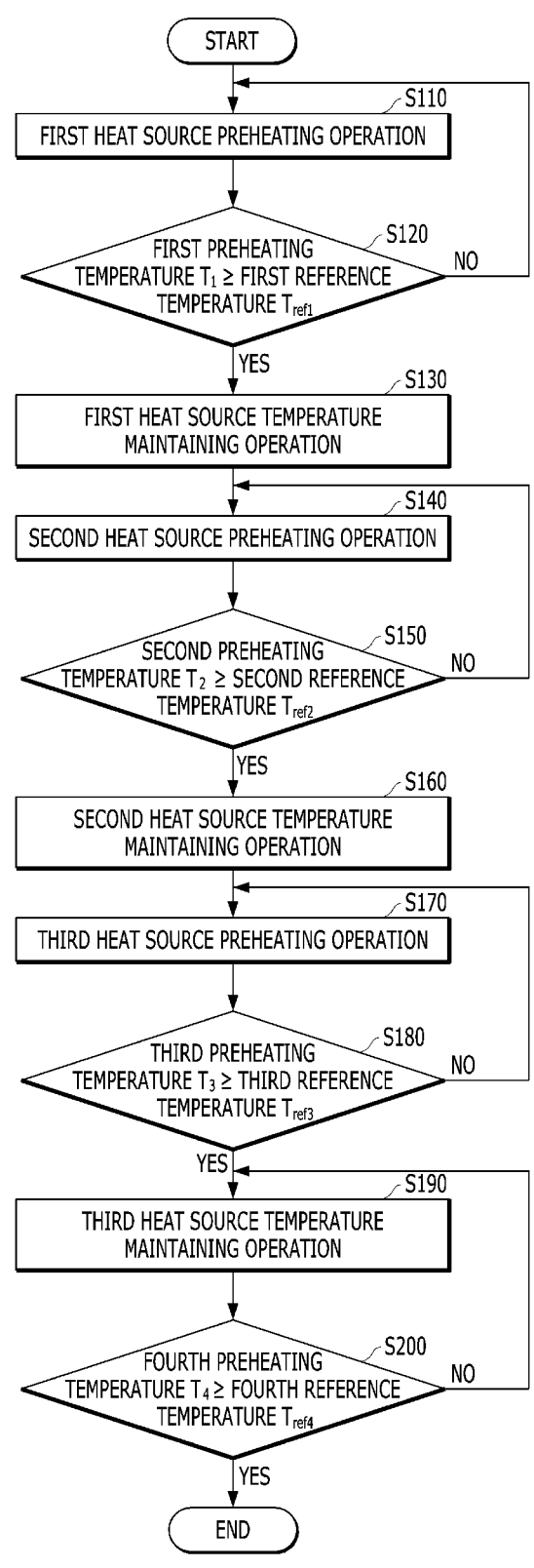

[FIG. 11]
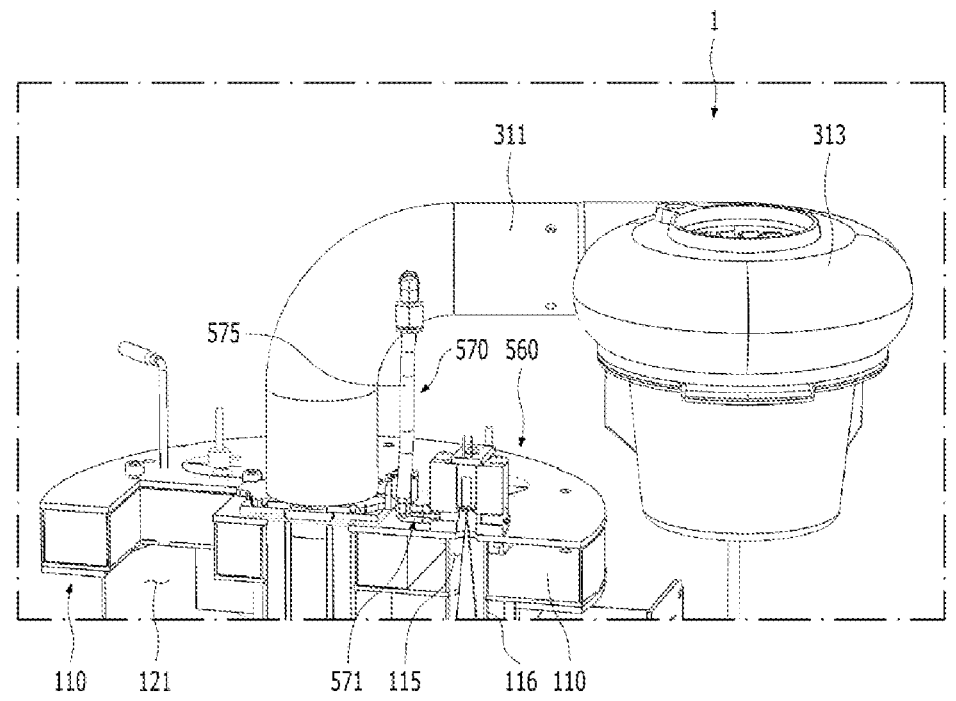

[FIG. 12]
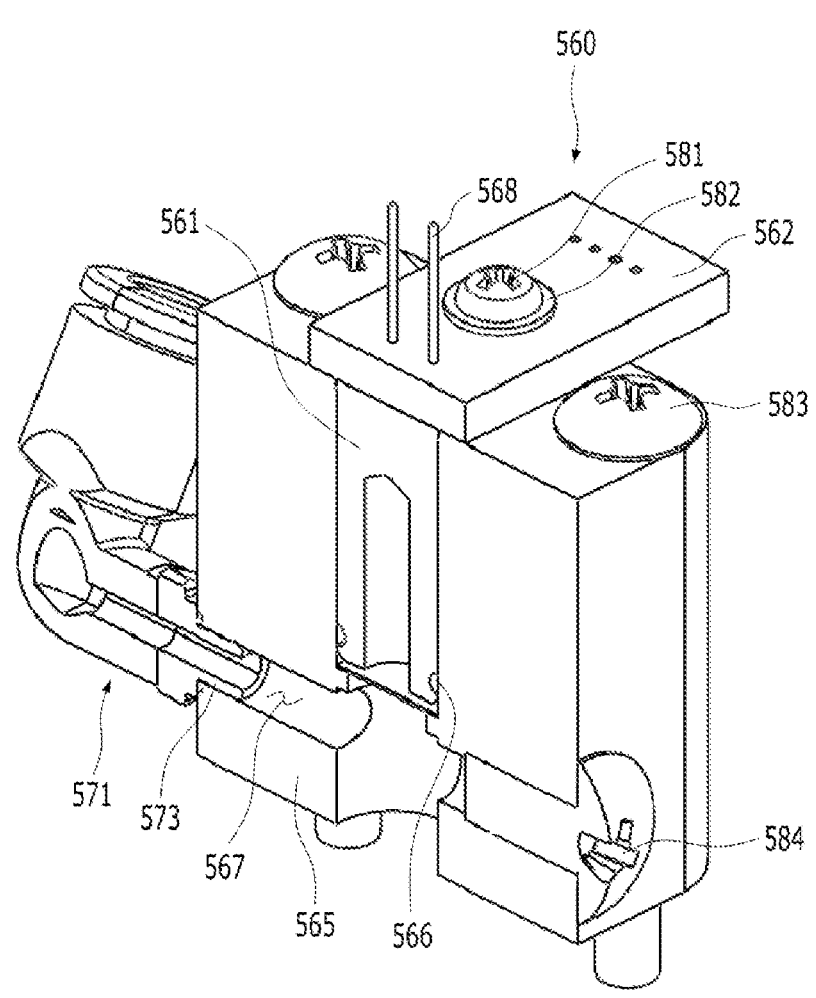

[FIG. 13]
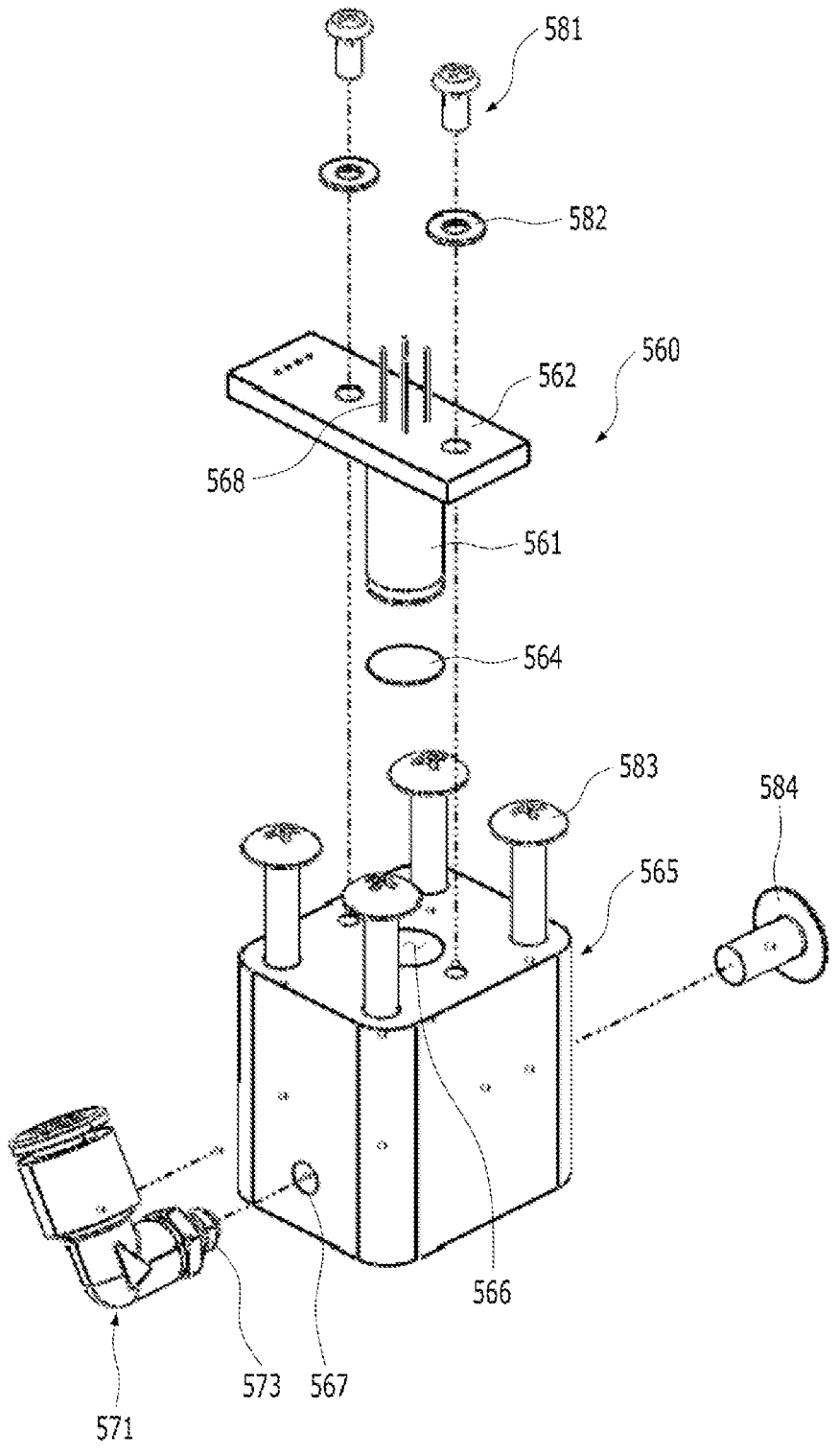

[FIG. 14]
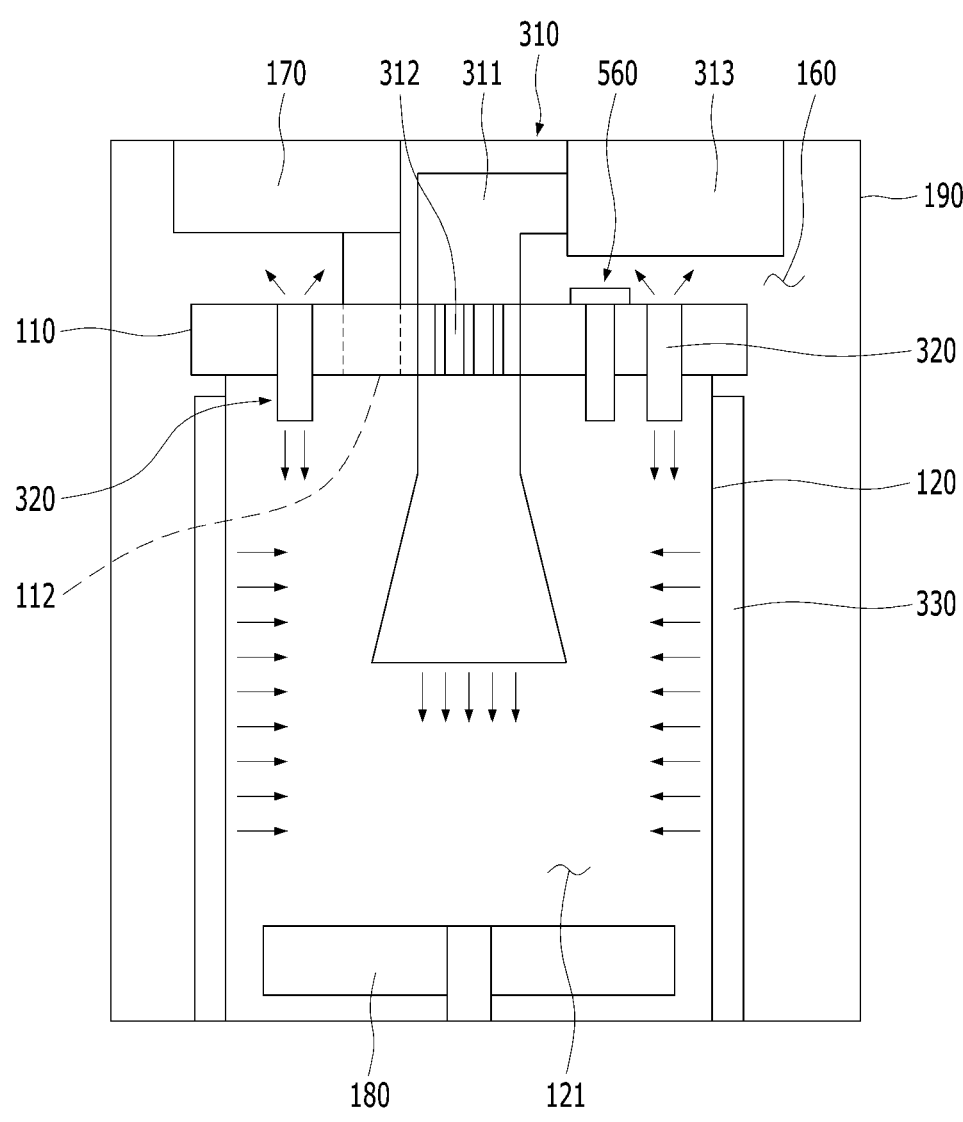

[FIG. 15]
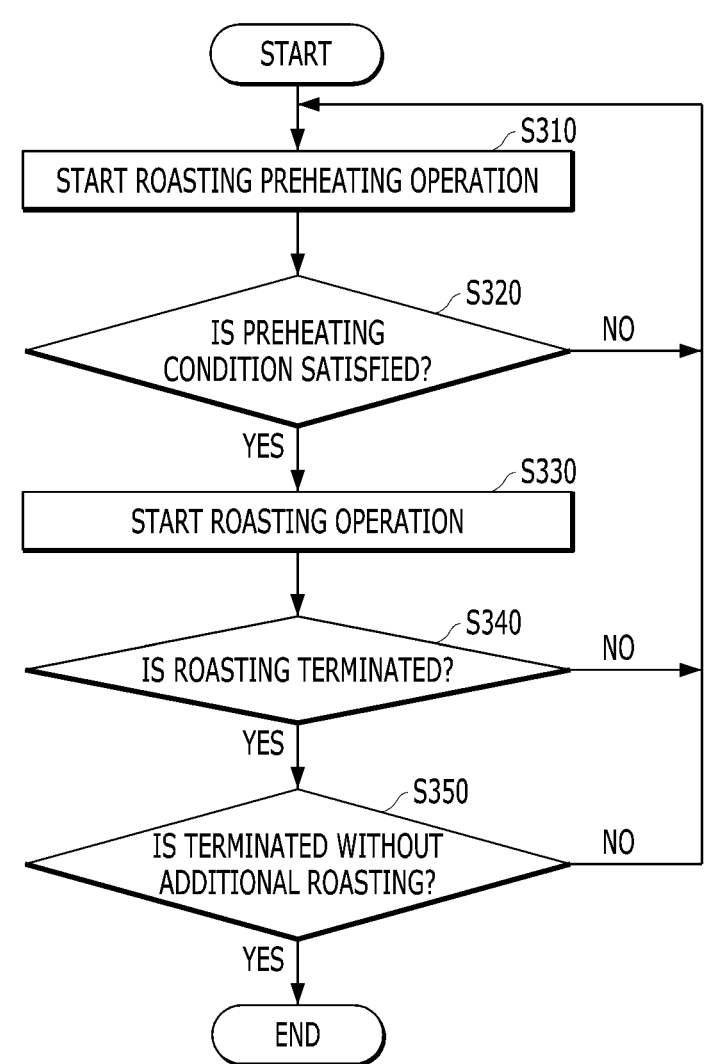

ROASTING APPARATUS AND CONTROLLING METHOD THEREOF

TECHNICAL FIELD

The present disclosure relates to a roasting apparatus and a method of controlling the roasting apparatus, and more particularly, to a roasting apparatus for roasting objects while stirring the objects in a roasting chamber, and a method of controlling the roasting apparatus.

BACKGROUND ART

Recently, there have been introduced grain roasters or coffee roasters that may easily and automatically roast grains such as coffee beans in a professional coffee shop or at home.

Such a coffee roaster automatically roasts coffee beans in a roasting operation mode set by using a temperature sensor and a microcomputer.

An automatic coffee roaster for business use in the related art mainly has a horizontally rotating drum and rotates the drum forward and backward to stir coffee beans so that the coffee beans are evenly roasted well (Korean Patent Nos. 342091, 369539, 463341, 804106, 887985, and 963695, and Korean Patent Application Laid-Open Nos. 2009-30655 and 2010-38802).

However, because the automatic coffee roaster in the related art heats the horizontally rotating drum by using only a single heat source such as direct gas combustion, there is a problem in that a large amount of time is required for preheating and it is impossible to cope with various roasting environments.

DISCLOSURE

Technical Problem

An object of the present disclosure is to provide a roasting apparatus with improved productivity by reducing a roasting preheating operation time and a method of controlling the same.

Another object of the present disclosure is to provide a roasting apparatus capable of more effectively measuring a roasting process of an object to allow a user to perform desired roasting, and a method of controlling the same.

Still another object of the present disclosure is to provide a roasting apparatus capable of improving roasting quality and a method of controlling the same.

Technical Solution

One aspect of the present disclosure provides a roasting apparatus for heating an object, which includes a roasting chamber part which includes a cylindrical roasting chamber, in which an object is stirred and which extends in a vertical direction, and a rotary stirring part rotated to stir the object accommodated in the roasting chamber, wherein the rotary stirring part is rotated about a stirring axis formed in the vertical direction; a casing unit configured to surround the roasting chamber part; a heat source part including a first heat source part configured to provide radiant heat to the roasting chamber part; and a radiant temperature measurement unit configured to measure a temperature of the roasting chamber or the object and a chamber outer space temperature of a chamber outer space between the casing unit and the roasting chamber part on the basis of infrared rays emitted from an inner surface of the roasting chamber part or a surface of the object, which is heated by the heat source part, wherein a preheating operation is performed until the chamber inner temperature of the roasting chamber and the chamber outer space temperature reach a preset reference chamber inner temperature and a preset reference chamber outer space temperature.

The radiant temperature measurement unit may be disposed in an upper unit disposed above the roasting chamber and may face an internal space of the roasting chamber, and the radiant temperature measurement unit may include a sensing part configured to measure the temperature of the object on the basis of the infrared rays and face the roasting chamber; an outer space temperature measurement unit configured to measure the chamber outer space temperature of the chamber outer space; and a board on which the sensing part and the outer space temperature measurement unit are mounted.

The reference chamber outer space temperature may be in the range of 55 degrees Celsius to 90 degrees Celsius.

A measured temperature $T_{measure}$ of the roasting chamber or the object, which is measured by the radiant temperature measurement unit, may be corrected on the basis of a chamber outer space temperature $T_{outside}$, and then a real temperature of the roasting chamber or the object may be calculated.

A measurement hole may be formed to pass through the upper unit and communicates with the roasting chamber; the radiant temperature measurement unit may include a sensing part configured to measure the temperature of the object on the basis of the infrared rays, a measuring unit body which is disposed on an upper surface of the upper unit and in which a body side through hole communicating with the roasting chamber is formed, a board which is disposed on one side of the measuring unit body and on which the sensing part is mounted, and a filter part which is disposed in front of the sensing part and through which light of a preset wavelength band passes; the body side through hole may communicate with the measurement hole, and the sensing part may be positioned in the body side through hole; one surface of the filter part may face the sensing part, and the other surface thereof may directly face the roasting chamber; and emissivity of the filter part may be varied according to a temperature.

The real temperature $T_{real}$ may be calculated in consideration of an emissivity change of the filter part on the basis of an outside temperature $T_{outside}$ at the measured temperature $T_{measure}$, and the real temperature $T_{real}$ and the measured temperature $T_{measure}$ may satisfy the following relational expression:

$$T_{real,k} = \frac{T_{measure,k} - (E_0 + T_{outside,c} \times e) \times T_{outside,k}}{(1 - E_0) - T_{outside,c} \times e},$$

wherein $T_{real,k}$ denotes a corrected real temperature of the object (based on absolute temperature), $T_{measure,k}$ denotes a measured temperature of the object measured by the sensing part (based on absolute temperature), $T_{outside,c}$ denotes an outside temperature of the roasting chamber (based on degrees Celsius), $T_{outside,k}$ denotes an outside temperature of the roasting chamber (based on absolute temperature), $E_0$ denotes emissivity of the filter part at zero degrees Celsius, and e denotes variance in emissivity per absolute temperature 1 degree (or 1 degree Celsius) of the filter part.

The first heat source part of the heat source part may be installed in the upper unit in a state of being disposed inside the roasting chamber, and a through-hole may be formed in the upper unit to allow a portion of light emitted from the first heat source part to leak toward the chamber outer space.

The heat source part may further include a second heat source part which provides convection heat to the roasting chamber and includes an inlet tube configured to induce an airflow toward the roasting chamber part and a heater unit installed in the inlet tube; and a third heat source part configured to surround at least a portion of an outer circumferential surface of the roasting chamber part and provide conductive heat to the roasting chamber through the roasting chamber part.

Another aspect of the present disclosure provides a roasting apparatus for heating an object, which includes a roasting chamber part which includes a cylindrical roasting chamber, in which an object is stirred and which extends in a vertical direction, and a rotary stirring part rotated to stir the object accommodated in the roasting chamber, wherein the rotary stirring part is rotated about a stirring axis formed in the vertical direction; a heat source part including a first heat source part configured to supply heat to the roasting chamber part and provide hot air to the roasting chamber part to provide convection heat inside the roasting chamber; and a radiant temperature measurement unit configured to measure a temperature of the roasting chamber or the object on the basis of infrared rays emitted from an inner surface of the roasting chamber part or a surface of the object, which is heated by the heat source part.

The first heat source part may include a flow tube through which air flows, and a heating unit disposed on one side of the flow tube and configured to heat the flowing air; the radiant temperature measurement unit may be disposed in an upper unit disposed above the roasting chamber and faces an internal space of the roasting chamber; a measurement hole is formed to pass through the upper unit and communicates with the roasting chamber; the radiant temperature measurement unit may include a sensing part configured to measure the temperature of the object on the basis of the infrared rays, a measuring unit body which is disposed on an upper surface of the upper unit and in which a body side through hole communicating with the roasting chamber is formed, a board which is disposed on one side of the measuring unit body and on which the sensing part is mounted, and a filter part which is disposed in front of the sensing part and through which light of a preset wavelength band passes; the body side through hole may communicate with the measurement hole, and the sensing part may be positioned in the body side through hole; one surface of the filter part may face the sensing part, and the other surface thereof may directly face the roasting chamber; a ventilation hole is formed in the measuring unit body in a direction intersecting a direction in which the body side through hole is formed, and the body side through hole and the ventilation hole intersect each other; the roasting apparatus may further include a ventilation part having one side communicating with the flow tube and the other side communicating with the ventilation hole; and an air flow introduced into the ventilation hole through the ventilation part may be formed on a rear surface of the filter part.

The ventilation part may include a pipe unit having one side communicating with the flow tube, and a plug unit having one side connected to the other side of the pipe unit and the other side connected to the ventilation hole, the plug unit may be formed in a bent shape, and a plug part inserted into the ventilation hole may be formed on the other side of the plug unit.

The ventilation hole may completely pass through one side and the other side of the measuring unit body, and a shielding part configured to shield the ventilation hole from the outside may be installed on the other side of the ventilation hole.

A cylindrical guide part configured to surround the measurement hole and protrude downward may be formed on a lower surface of the upper unit, and the guide part may be aligned with the measurement hole.

A measured temperature $T_{measure}$ of the roasting chamber or the object, which is measured by the radiant temperature measurement unit, may be corrected on the basis of an outer temperature $T_{outside}$ of the roasting chamber, and then a real temperature of the roasting chamber or the object may be calculated; the radiant temperature measurement unit may be disposed in an upper unit disposed above the roasting chamber and face an internal space of the roasting chamber; a measurement hole may be formed to pass through the upper unit and communicate with the roasting chamber; the radiant temperature measurement unit may include a sensing part configured to measure the temperature of the object on the basis of the infrared rays, a measuring unit body which is disposed on an upper surface of the upper unit and in which a body side through hole communicating with the roasting chamber is formed, a board which is disposed on one side of the measuring unit body and on which the sensing part is mounted, and a filter part which is disposed in front of the sensing part and through which light of a preset wavelength band passes; the body side through hole may communicate with the measurement hole, and the sensing part may be positioned in the body side through hole; one surface of the filter part may face the sensing part, and the other surface thereof may directly face the roasting chamber; and emissivity of the filter part may be varied according to a temperature.

The board may be disposed in an outer space of the roasting chamber and may include an outer space temperature measurement unit configured to measure an outer space temperature, the real temperature $T_{real}$ may be calculated in consideration of an emissivity change of the filter part on the basis of an outside temperature $T_{outside}$ at the measured temperature $T_{measure}$, and the real temperature $T_{real}$ and the measured temperature $T_{measure}$ may satisfy the following relational expression:

$$T_{real,k} = \frac{T_{measure,k} - (E_0 + T_{outside,c} \times e) \times T_{outside,k}}{(1 - E_0) - T_{outside,c} \times e},$$

wherein $T_{real,k}$ denotes a corrected real temperature of the object (based on absolute temperature), $T_{measure,k}$ denotes a measured temperature of the object measured by the sensing part (based on absolute temperature), $T_{outside,c}$ denotes an outside temperature of the roasting chamber (based on degrees Celsius), $T_{outside,k}$ denotes an outside temperature of the roasting chamber (based on absolute temperature), $E_0$ denotes emissivity of the filter part at zero degrees Celsius, and e denotes variance in emissivity per absolute temperature 1 degree (or 1 degree Celsius) of the filter part.

The roasting apparatus may further include a casing which forms an outer shape, and the outer space may be disposed between the casing and the roasting chamber.

Still another aspect of the present disclosure provides a method of controlling a roasting apparatus including a roasting chamber part in which a roasting chamber is formed and a casing unit surrounding the roasting chamber part, which includes a roasting preheating operation starting step of performing preheating on the roasting chamber; a preheating condition satisfaction determination step of determining whether a preheated state of the roasting chamber satisfies a preheating condition; and a roasting operation starting step of starting a roasting operation, wherein the preheating condition is whether a measured temperature $T_{measure}$ of the roasting chamber reaches a reference inner temperature and whether a chamber outer space temperature $T_{outside}$ of a chamber outer space formed between the roasting chamber and the casing unit reaches a reference chamber outer space temperature on the basis of preset temperature profile information.

The reference chamber outer space temperature may be in the range of 55 degrees Celsius to 90 degrees Celsius.

The method may further include an additional roasting progress determination step of determining whether to proceed with additional roasting, and, in the additional roasting progress determination step, when it is determined that the additional roasting is to be performed, the roasting preheating operation starting step and the roasting operation starting step may be consecutively performed on the basis of the preset roasting profile information.

Advantageous Effects

According to the proposed embodiments, a roasting apparatus with improved productivity by reducing a roasting preheating operation time and a method of controlling the same can be provided.

In addition, a roasting process of an object can be measured more effectively so that a user can perform desired roasting.

In addition, there is an advantage of being able to improve roasting quality.

DESCRIPTION OF DRAWINGS

FIG. 1 is a view illustrating a roasting apparatus according to an embodiment of the present disclosure.

FIG. 2 is a view illustrating a state in which an internal configuration of the roasting apparatus illustrated in FIG. 1 is projected.

FIG. 3 is a view illustrating a configuration of a roasting chamber part of the roasting apparatus illustrated in FIG. 1.

FIG. 4 is a view illustrating the roasting chamber part illustrated in FIG. 3 when viewed from above.

FIG. 5 is a view illustrating a state in which a third heat source part is removed from the roasting chamber part illustrated in FIG. 3.

FIG. 6 is a view illustrating an upper unit of the roasting chamber part illustrated in FIG. 3.

FIG. 7 is a view illustrating a cross section of the roasting chamber part illustrated in FIG. 3.

FIG. 8 is a view illustrating a state in which a first temperature detection unit of the roasting apparatus illustrated in FIG. 1 is disassembled.

FIG. 9 is a view illustrating a cross section of the first temperature detection unit illustrated in FIG. 8.

FIG. 10 is a view illustrating a method of controlling the roasting apparatus illustrated in FIG. 1.

FIG. 11 is a view illustrating an inner configuration of a roasting apparatus according to another embodiment of the present disclosure.

FIG. 12 is a view illustrating a cross section of a radiant temperature measurement unit of FIG. 11.

FIG. 13 is a view illustrating a configuration of the radiant temperature measurement unit of FIG. 11.

FIG. 14 is a view illustrating an inner configuration of a roasting apparatus according to still another embodiment of the present disclosure.

FIG. 15 is a view illustrating a method of controlling the roasting apparatus illustrated in FIG. 14.

MODE FOR INVENTION

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art to which the present disclosure pertains can fully understand the scope of the present disclosure. The present disclosure will be defined only by the scope of the appended claims.

Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present disclosure.

Throughout the specification, the same reference numerals denote the same constituent elements.

Respective features of several exemplary embodiments of the present disclosure may be partially or entirely coupled to or combined with each other, and as sufficiently appreciated by those skilled in the art, various technical cooperation and operations may be made, and the respective exemplary embodiments may be carried out independently of each other or carried out together correlatively.

Potential effects, which may be expected by technical features of the present disclosure that are not specifically mentioned in the specification of the present disclosure, are treated as being described in the present specification, and the present embodiments are provided to more completely explain the present disclosure to those skilled in the art. Therefore, the contents illustrated in the drawings may be exaggeratingly expressed in comparison with actual implementation of the present disclosure, and a detailed description of a configuration will be summarized or omitted when it is determined that the description may unnecessarily obscure the subject matter of the present disclosure.

Hereinafter, the embodiments of the present disclosure will be described in detail with reference to the accompanying drawings.

FIG. 1 is a view illustrating a roasting apparatus according to an embodiment of the present disclosure, and FIG. 2 is a view illustrating a state in which an internal configuration of the roasting apparatus illustrated in FIG. 1 is projected. FIG. 3 is a view illustrating a configuration of a roasting chamber part of the roasting apparatus illustrated in FIG. 1, and FIG. 4 is a view illustrating the roasting chamber part illustrated in FIG. 3 when viewed from above. FIG. 5 is a view illustrating a state in which a third heat source part is removed from the roasting chamber part illustrated in FIG. 3. FIG. 6 is a view illustrating an upper unit of the roasting chamber part illustrated in FIG. 3, and FIG. 7 is a view illustrating a cross section of the roasting chamber part illustrated in FIG. 3. FIG. 2 illustrates a state in which a casing unit 190 is rendered in a semi-transparent manner and an internal configuration of a roasting apparatus 1 is projected outward in a state in which the casing unit 190 is installed which defines an external shape of the roasting apparatus 1.

Referring to FIGS. 1 to 7, the roasting apparatus 1 according to the embodiment of the present disclosure refers to an apparatus for roasting objects such as coffee beans by heating the objects. The roasting apparatus 1 includes a roasting chamber part 100 in which the objects are received and roasted, a control panel part 200 which displays information about a roasting situation of the objects and receives an operating signal from a user, an object storage part 400 which stores the objects completely roasted in the roasting chamber part 100, and heat source parts 310, 320, and 330 which supply heat to the roasting chamber part 100. The roasting chamber part 100 is surrounded by the casing unit 190 made of metal.

In more detail, the roasting chamber part 100 includes a cylindrical roasting chamber 120 which extend in a vertical direction and has an internal space 121 in which the objects are stirred, a rotary stirring part 180 which includes stirring blade units 181 that rotates to stir the objects received in the roasting chamber 120, an upper unit 110 that has a circular shape and is disposed at an upper side of the roasting chamber 120, a lower unit 130 that has a circular shape and is disposed at a lower side of the roasting chamber 120, and a discharge unit 150 which communicates with the internal space 121 of the roasting chamber 120 and is selectively opened to discharge, to the outside, the objects completely roasted in the internal space 121 of the roasting chamber 120.

The roasting chamber 120 may be formed in a cylindrical shape extending in the vertical direction, and a stationary blade 122 may be formed on an inner surface of the roasting chamber 120 so as to stir the objects more smoothly. The stationary blade 122 protrudes from the inner surface of the roasting chamber 120, and the stationary blade 122 is shaped such that a protruding height of the stationary blade 122 is increased from the lower side to the upper side of the roasting chamber 120.

The discharge unit 150 may include a door portion (not illustrated) which is opened or closed based on an operating signal of a control unit (not illustrated), and a lever portion (not illustrated) which is used by a user to forcibly open the door portion in an emergency situation, regardless of a control signal of the control unit. The discharge unit 150 extends to be inclined toward the object storage part 400, such that when the door portion of the discharge unit 150 is opened, the roasted objects may be supplied to the object storage part 400.

Further, the stirring blade units 181 of the rotary stirring part 180 are rotated about a stirring axis defined in the vertical direction. Therefore, in the state in which the roasting chamber part 100 according to the present embodiment extends in the vertical direction, the stirring blade units 181 of the rotary stirring part 180 are rotated about the stirring axis defined in the vertical direction to stir the objects. This is advantageous in that the objects may be more efficiently roasted and the roasting apparatus 1 may be more efficiently disposed.

The heat source parts 310, 320, and 330 include a first heat source part 310 which provides convection heat to an interior of the roasting chamber 120 by providing a hot air flow to the roasting chamber 120, a second heat source part 330 which is in contact with a surface of the roasting chamber 120 and provides conduction heat to the roasting chamber 120 in a conduction manner, and a third heat source part 320 which provides radiant heat to the interior of the roasting chamber 120.

The first heat source part 310 includes a flow tube 311 through which air flows, and a heating unit 312 which is disposed at one side of the flow tube 311 and heats the flowing air. The flow tube 311 is connected to a blow unit 313 for supplying air and is supplied with the air, and one side of the heating unit 312 and one side of the flow tube 311 are connected to the upper unit 110. For example, the heating unit 312 has a plurality of heating elements which are disposed in the form of a mesh or a coil, and the air is heated while passing through the heating elements.

The second heat source part 330 includes a second heat source part body which surround an outer circumferential surface of the roasting chamber 120 in a state in which the second heat source part body is in contact with the outer circumferential surface of the roasting chamber 120. The second heat source part body may be a band heater made of a ceramic material.

Meanwhile, the roasting chamber 120 has at least one roasting chamber side through hole which communicates with the outside, and the second heat source part body has a second heat source part body side through hole which is formed at a position corresponding to the roasting chamber side through hole.

For example, the roasting apparatus 1 further includes a sample collection unit 161 which collects a sample during a roasting process, and a window unit 162 which enables the user to visually check the roasting process in the roasting chamber 120. The sample collection unit 161 and the window unit 162 are installed in the roasting chamber side through holes and the second heat source part body side through holes. An air discharge port 163 is formed at the upper side of the roasting chamber 120 and communicates with the internal space of the roasting chamber 120. The second heat source part 330 is not disposed in an area of the air discharge port 163. That is, the second heat source part 330 is installed only up to a predetermined height from the outer circumferential surface of the roasting chamber 120, and an object receiving limit line of the internal space 121 of the roasting chamber 120, in which the objects are received, may be defined to the height at which the second heat source part 320 is installed.

Dust (bean pods and the like), which generated from the objects during the roasting process, is delivered to a dust collection unit 600 through the air discharge port 163. The dust collection unit 600 discharges the air to the outside, and stores the dust in a dust storage (not illustrated) therein.

The third heat source part 320 may include a lamp unit 321 which emits radiant heat and is installed on the upper unit 110 and provides the radiant heat to the internal space 121 of the roasting chamber 120. For example, the lamp unit 321 may be a halogen lamp.

Meanwhile, the upper unit 110 includes an upper unit body 111 having a circular shape. The upper unit body 111 has a first heat source arrangement hole 113 to which the heating unit 312 of the first heat source part 310 is fixed and through which heated air flows to the internal space 121 of the roasting chamber 120, a third heat source arrangement hole 114 to which the lamp unit 321 of the third heat source part 320 is fixed and through which the radiant heat emitted from the lamp unit 321 is transferred to the internal space 121 of the roasting chamber 120, and an object supply hole 112 which is connected to a hopper unit 170 of the roasting apparatus 1 and through which the objects are inputted into the internal space 121 of the roasting chamber 120. In addition, a diffuser part 118 is provided at a lower side of the upper unit 110, guides the hot air flow supplied from the first heat source part 310, and has a diameter that increases downward. The diffuser part 118 extends from a lower surface of the upper unit 110 to the rotary stirring part 180 disposed at the lower side of the roasting chamber 120. A recessed groove (not illustrated) may be formed in the stirring blade unit 181 of the rotary stirring part 180 in order to avoid interference with the diffuser part 118.

The pair of lamp units 321 of the third heat source part 320 and the pair of third heat source arrangement holes 114 may be provided, and the first heat source arrangement hole 113 is provided between the pair of third heat source arrangement holes 114. The first heat source arrangement hole 113 disposed at a center of the upper unit body 111 has a circular shape, and the third heat source arrangement hole 114 has a rectangular shape. Meanwhile, a third heat source guide unit 119 is provided on the upper unit body 111 according to the present embodiment, surrounds the third heat source arrangement hole 114 and extends downward. The third heat source guide unit 119 has a rectangular cross-section shape corresponding to the third heat source arrangement hole 114. The third heat source guide unit 119 may prevent a surface of the lamp unit 321 of the third heat source 320 from being contaminated by the dust generated from the objects during the roasting process in the roasting chamber 120.

The roasting apparatus 1 according to the present embodiment further includes measurement units 510, 520, and 530 which measure heat source supply temperatures of the heat source parts 310, 320, and 330 that supply heat to the roasting chamber 120.

A radiant temperature measurement unit 510 measures radiant temperatures of the objects received in the internal space 121 of the roasting chamber 120. The radiant temperature measurement unit 510 is directed toward the internal space 121 of the roasting chamber 120 and disposed on the upper unit 110 disposed at the upper side of the roasting chamber 120. In this case, the upper unit body 111 has a measurement hole 115 which penetrates the upper unit body 111 in the vertical direction. The measurement hole 115 is positioned at an eccentric position from the center of the upper unit body 111. The radiant temperature measurement unit 510 according to the present embodiment measures a change in temperature of the objects by detecting infrared rays, emitted from surfaces of the objects, during the roasting process. Therefore, the roasting apparatus 1 according to the embodiment of the present disclosure may advantageous accurately detect the temperatures of the objects and accurately perform the roasting desired by the user in comparison with a roasting apparatus in the related art which detects only a change in temperature in the roasting chamber 120. During a process of performing a preheating operation of preheating the roasting chamber 120 before inputting the objects into the roasting chamber 120, the radiant temperature measurement unit 510 may detect a temperature of a surface of the lower unit 130 which defines a bottom surface of the roasting chamber 120.

As described below, a plurality of experiments was performed on installation positions of the radiant temperature measurement unit 510 according to the present embodiment. In the present embodiment, the radiant temperature measurement unit 510 was installed at an optimum installation position directed toward the lower side from the upper unit 110, that is, directed toward the internal space 121 of the roasting chamber 120 from the upper unit 110.

TABLE 1

| Installation Positions | Scratch of filter | Thermal damage to filter | Measurement Accuracy |
|---|---|---|---|
| Upper portion of roasting chamber | X | X | High |
| Central portion of roasting chamber | O | X | High |
| Lower portion of roasting chamber | O | O | Low |

Hereinafter, the radiant temperature measurement unit 510 according to the present embodiment will be described in more detail.

FIG. 8 is a view illustrating a state in which a first temperature detection unit of the roasting apparatus illustrated in FIG. 1 is disassembled, and FIG. 9 is a view illustrating a cross section of the first temperature detection unit illustrated in FIG. 8.

Referring to FIGS. 8 and 9, the radiant temperature measurement unit 510 includes a sensing part 511 which measures a temperature, a filter part 514 which is disposed in front of the sensing part 511 and transmits light in a predetermined wavelength band, a first bracket 513 which is fixed to the upper unit body 111 of the roasting chamber part 100 and has a first through hole 519 formed therein, a second bracket 521 which has one side being in contact with and fixed to the first bracket 513 and a second through hole 526 that is formed therein and aligned with the first through hole 519 and into which the sensing part 511 is fitted, and a board 512 which is fixed to the other side of the second bracket 521 and on which a sensing part 511 is mounted.

In this case, the sensing part 511, the first through hole 519, the second through hole 526, and the filter part 514 are aligned with the measurement hole 115 of the upper unit 110, and the filter part 514 is installed between the first bracket 513 and the second bracket 521.

The sensing part 511 has a cylindrical shape and senses infrared rays emitted from the objects. The sensing part 511 extends in a direction identical to the penetration direction of the measurement hole 115. For example, the sensing part 511 may be an IR sensor.

For example, the filter part 514 may be made of a material, such as glass or silicone, which is transparent and less deformed by heat. The filter part 514 transmits only the light beams in an infrared band among the light beams transmitted to the sensing part 511 from the roasting chamber 120.

The first bracket 513 includes a first bracket body 515 which defines an external shape of the first bracket 513 and has the first through hole 519 disposed at a center thereof, and a pair of protruding portions 518 which protrude upward from one side of the first bracket body 515. A recessed space 517 is provided between the protruding portions 518, and a pair of first bracket fixing portion 516 protrudes from a lower side of the first bracket body 515 and is penetrated by first fastening members 630 fastened to the upper unit body 111.

The second bracket 521 includes a second bracket body 522 which defines an external shape of the second bracket 521, an insertion portion 523 which is formed at one side of the second bracket body 522 and fitted into the recessed space of the first bracket 513, a board seating surface 524 which is disposed on an upper surface of the second bracket 521 and on which the board 512 is seated, and a pair of board fixing protrusions 525 which protrude upward from a rim of the board seating surface 524 and by which one side and the other side of the board 512 are caught.

In a state in which the filter part 514 is aligned with the first through hole 519 disposed in the recessed space 517, the filter part 514 is in close contact between the recessed space 517 of the first bracket 513 and the insertion portion 523 of the second bracket 521. In a state in which the insertion portion 523 of the second bracket 521 is inserted into the recessed space 517 of the first bracket 513, the first bracket 513 and the second bracket 521 may be fixed by second fastening members 620 which integrally penetrate the pro-truding portions 518 of the first bracket 513 and the insertion portion 523 of the second bracket 521. That is, in the state in which the first through hole 519 is sealed by the filter part 514, the first bracket 513 and the second bracket 521 are securely fixed to each other with the filter part 514 inter-posed therebetween, and as a result, it is possible to prevent foreign substances in the internal space 121 of the roasting chamber 120 from entering the inside and the outside the radiant temperature measurement unit 510 through the first through hole 519 which communicates with the measure-ment hole 115 of the roasting chamber 120. Meanwhile, an elastic member (not illustrated) made of rubber or silicone may be disposed in at least one of an area between the filter part 514 and the first bracket 513 and an area between the filter part 514 and the second bracket 521 and securely seal the space and inhibit damage to the filter part 514.

The sensing part 511 is fitted into the second through hole 526 of the second bracket 521. In a state in which the board 512 is seated on the seating surface 524, third fastening members 610 may be fixed to fastening holes 527 of the second bracket 521 through the board 512 and securely fix the board 512 and the second bracket 521.

The board 512 may be a PCB having a plate shape. A roasting chamber outside temperature measurement element (not illustrated) may be provided on the board 512 and measure an outside temperature of the roasting chamber 120 at a position at which the board 512 is installed, that is, an outside temperature of a portion adjacent to the roasting chamber 120. That is, the radiant temperature measurement unit 510 according to the present embodiment may measure the radiant temperature of the internal space 121 of the roasting chamber 120 and the temperature of the external space of the roasting chamber 120.

Further, a cylindrical guide part 116 is provided on the lower surface of the upper unit 110 and protrudes downward while surrounding the measurement hole 115, and the guide part 116 is aligned with the measurement hole 115. That is, since the guide part 116 surrounds the measurement hole 115 and protrudes to the internal space 121 of the roasting chamber 120, it is possible to prevent the dust, which is generated in the internal space 121 of the roasting chamber 120 during the roasting process, from entering the measure-ment hole 115 and contaminating the surface of the filter part 514. The sensing part 511 may emit the light for measure-ment to the internal space 121 of the roasting chamber 120 or receive the light emitted from the objects through the measurement hole 115 surrounded by the guide part 116.

Referring back to FIGS. 3 to 7, the measurement units 510, 520, 530, 540, and 550 of the roasting apparatus 1 according to the present embodiment further include a convection temperature measurement unit 530 which is disposed in a flow path of the hot air flow supplied to the roasting chamber 120 by the first heat source part 310, and measures a convection temperature of the hot air flow, a conduction temperature measurement unit 540 which has a conduction temperature measurement probe 541 disposed between the second heat source part 330 and the outer circumferential surface of the roasting chamber 120 and measures a conduction temperature of the second heat source part 330, and a contact temperature measurement unit 550 which is installed at the lower side of the roasting chamber 120, is in direct contact with the objects during the roasting process and measures the temperatures of the objects.

In this case, a convection temperature measurement probe 531 of the convection temperature measurement unit 530 penetrates a lateral portion of the roasting chamber 120 and the diffuser part 118, and a tip portion of the convection temperature measurement probe 531 may be positioned at a downstream side of the heating unit 312 and measure the temperature of the hot air flow passing through the heating unit 312.

In a state in which the conduction temperature measure-ment probe 541 of the conduction temperature measurement unit 540 is disposed between the second heat source part 330 and the roasting chamber 120, the conduction temperature measurement probe 541 of the conduction temperature mea-surement unit 540 is in contact with both an inner surface of the second heat source part body 331 and the outer circum-ferential surface of the roasting chamber 120. In this case, the conduction temperature measurement probe 541 of the conduction temperature measurement unit 540 is disposed at a position most distant from the roasting chamber side through hole and the second heat source part body side through hole. That is, the roasting chamber side through hole and the second heat source part body side through hole communicate with the outside, and the heating element of the second heat source part 330 is not disposed at the corresponding position, such that the measured temperature is relatively high at the position most distant from the roasting chamber side through hole and the second heat source part body side through hole. Therefore, the conduc-tion temperature measurement probe 541 of the conduction temperature measurement unit 540 is disposed at the posi-tion most distant from the roasting chamber side through hole and the second heat source part body side through hole, such that the conduction temperature measurement probe 541 measures the conduction temperature based on the highest temperature.

Hereinafter, a method of controlling the roasting appara-tus according to the present embodiment, particularly, a method of controlling a preheating operation will be described in detail.

FIG. 10 is a view illustrating a method of controlling the roasting apparatus illustrated in FIG. 1.

Referring to FIG. 10, before the objects are inputted into the roasting apparatus 1 according to the present embodi-ment and the objects are roasted, a preheating operation is performed to raise a temperature of the internal space 121 of the roasting chamber 120 to a preheating temperature at a desired level. The roasting apparatus 1 according to the present embodiment may complexly use the three heat sources to perform the preheating operation, thereby more quickly raising the temperature of the internal space 121 to a desired preheating temperature. After the preheating operation is ended, the roasting apparatus 1 according to the present embodiment may differently control the three heat sources depending on the user's preference, thereby performing roasting to implement flavor desired by the user.

First, a first heat source preheating operation step S110 is performed, in which the first heat source part provides the hot air flow to the internal space of the roasting chamber.

Next, when a measured first preheating temperature $T_1$ is equal to or higher than a first reference temperature $T_{ref1}$ (S120) in the first heat source preheating operation step S110, a first heat source temperature maintaining operation step S130 is performed, in which the first heat source part 310 provides the convection heat so that the first preheating temperature $T_1$ is maintained as the first reference temperature $T_{ref1}$. In this case, the first preheating temperature $T_1$ according to the present embodiment may be the convection temperature of the hot air flow measured by the convection temperature measurement unit 530, and in the first heat source temperature maintaining operation step S130, electric power, at a level lower than the first heat source preheating operation step S110, is supplied to the first heat source part 310.

Further, when the measured first preheating temperature $T_1$ is lower than the first reference temperature $T_{ref1}$ S120, the first heat source preheating operation step S110 is repeatedly performed.

Next, a second heat source preheating operation step S130 is performed, in which the second heat source part 330 provides the conduction heat to the internal space 121 of the roasting chamber 120.

When a measured second preheating temperature $T_2$ is equal to or higher than a second reference temperature $T_{ref2}$ (S150) in the second heat source preheating operation step S130, a second heat source temperature maintaining operation step S160 is performed (S160), in which the second heat source part 330 provides the conduction heat so that the second preheating temperature $T_2$ is maintained as the second reference temperature $T_{ref2}$. In this case, the second preheating temperature $T_2$ according to the present embodiment may be the conduction temperature of the second heat source part 330 measured by the conduction temperature measurement unit 540, and in the second heat source temperature maintaining operation step S160, electric power, at a level lower than the second heat source preheating operation step S140, is supplied to the second heat source part 330.

When the measured second preheating temperature $T_2$ is lower than the second reference temperature $T_{ref2}$ (S150), the second heat source preheating operation step S140 is repeatedly performed.

Next, a third heat source preheating operation step S170 is performed, in which the third heat source part 320 provides the radiant heat to the internal space 121 of the roasting chamber 120.

When a measured third preheating temperature $T_3$ is equal to or higher than a third reference temperature $T_{ref3}$ (S190) in the third heat source preheating operation step S170, a third heat source temperature maintaining operation step S190 is performed, in which the third heat source part 320 provides the radiant heat so that the third preheating temperature $T_3$ is maintained as the third reference temperature $T_{ref3}$. In this case, the third preheating temperature $T_3$ according to the present embodiment may be the radiant temperature of the internal space 121 of the roasting chamber 120 measured by the radiant temperature measurement unit 510, and in the third heat source temperature maintaining operation step S190, electric power, at a level lower than the third heat source preheating operation step S170, is supplied to the third heat source part 320.

Further, when the measured third preheating temperature $T_3$ is lower than the third reference temperature $T_{ref3}$ (S180), the third heat source preheating operation step S170 is repeatedly performed.

Next, when a fourth preheating temperature $T_4$, which is a temperature measured outside the roasting chamber 120, is raised to a fourth reference temperature $T_{ref4}$ (S200), the preheating operation is ended.

Further, when the measured fourth preheating temperature $T_4$ is lower than the fourth reference temperature $T_{ref4}$ (S200), the third heat source temperature maintaining operation S190 is repeatedly performed. In this case, the first heat source temperature maintaining operation step S130 and the second heat source temperature maintaining operation step S160 are also continuously performed.

That is, the first preheating temperature $T_1$, the second preheating temperature $T_2$, the third preheating temperature $T_3$, and the fourth preheating temperature $T_4$ according to the present embodiment are measured at different positions. The first preheating temperature $T_1$, the second preheating temperature $T_2$, and the third preheating temperature $T_3$ are the convection temperature, the conduction temperature, and the radiant temperature of the heat transferred from the first heat source part 310, the second heat source part 330, and the third heat source part 320. The fourth preheating temperature $T_4$ is the temperature of the external space adjacent to the roasting chamber 120, that is, a temperature by which the temperature of the internal space 121 of the roasting chamber 120 may be estimated.

According to the proposed embodiment, it is possible to provide the roasting apparatus and the method of controlling the same, which reduce a preheating operation time for roasting, thereby further improving productivity.

The roasting apparatus and the method of controlling the same may more effectively measure the process of roasting objects, thereby performing roasting desired by the user.

FIG. 11 is a view illustrating an inner configuration of a roasting apparatus according to another embodiment of the present disclosure. In addition, FIG. 12 is a view illustrating a cross section of a radiant temperature measurement unit of FIG. 11, and FIG. 13 is a view illustrating a configuration of the radiant temperature measurement unit of FIG. 11.

The present embodiment differs only in the configuration of the radiant temperature measurement unit and a configuration for correcting a radiant temperature measurement result, and other configurations of the present embodiment are substantially the same as those of the roasting apparatus shown in FIGS. 1 to 10, and thus hereinafter, a feature portion of the present embodiment will be mainly described.

Referring to FIGS. 11 to 13, a roasting apparatus 1 according to an embodiment of the present disclosure includes a cylindrical roasting chamber 120 in which an object is stirred and which extends in the vertical direction, and a rotary stirring part 180 configured to be rotated to stir the object accommodated in the roasting chamber 120, and the rotary stirring part 180 includes a roasting chamber part 100 that rotates about a stirring shaft formed in the vertical direction, and a heat source part including a first heat source part 310 configured to supply heat to the roasting chamber part 100 and provide convective heat inside the roasting chamber by providing hot air to the roasting chamber part 100. In addition, the roasting apparatus 1 includes a radiant temperature measurement unit 560 configured to measure a temperature of the roasting chamber 120 or the object on the basis of infrared rays emitted from an inner surface of the roasting chamber 120 or a surface of the object, which is heated by the heat source part. The radiant temperature measurement unit 560 is disposed on an upper unit 110 disposed above the roasting chamber 120 to face an internal space side of the roasting chamber 120. A measurement hole 115 is formed through the upper unit 110 to communicate with the roasting chamber 120.

In addition, a cylindrical guide part 116 formed to surround the measurement hole 115 and protrude downward is formed on a lower surface of the upper unit 110, and the guide part 116 is aligned with the measurement hole 115. That is, the guide part 116 surrounding the measurement hole 115 is formed to protrude toward an internal space 121 of the roasting chamber 120 so that, in the internal space 121 of the roasting chamber 120, dust generated during the roasting process may be prevented from flowing into the measurement hole 115 to contaminate a surface of a filter part 514. A sensing part 511 may emit light for measuring to the internal space 121 of the roasting chamber 120 through the measurement hole 115 surrounded by the guide part 116 or receive light reflected from the object.

The first heat source part 310 includes a flow tube 311 through which air flows, and a heating unit 312 (see FIGS. 5 and 7) disposed on one side of the flow tube 311 and configured to heat the flowing air. The flow tube 311 is connected to the blow unit 313 configured to supply air and supplies air, and one sides of the heating unit 312 and the flow tube 311 are connected to the upper unit 110. For example, the heating unit 312 includes a plurality of heating elements disposed in the form of a mesh or a coil, and air is heated while passing through the heating elements.

The radiant temperature measurement unit 560 includes a sensing part 561 configured to measure a temperature of an object on the basis of infrared rays, a measuring unit body 565 which is disposed on the upper surface of the upper unit 110 and in which a body side through hole 566 communicating with the roasting chamber 120 is formed, a board 562 which is disposed on one side of the measuring unit body 565 and on which the sensing part 561 is mounted, and a filter part 564 which is disposed in front of the sensing part 561 and through which light of a preset wavelength band passes. For example, the sensing part 561 may be formed in a column shape, and more specifically, in a cylindrical shape.

The board 562 is disposed in the outer space of the roasting chamber 120 and includes an outer space temperature measurement unit (not illustrated) for measuring a temperature of the outer space. The outer space is disposed between a casing unit 190 (see FIG. 1) and the roasting chamber 120. A connection terminal 568 for transmitting temperature measurement data is formed on an upper surface of the board 562, and the board 562 is fixed to the measuring unit body 565 by a first fastening member 581 passing through the board 562 and a washer member 582.

For example, the measuring unit body 565 may be formed as a single body, and a fastening hole passing through an upper surface to a lower surface is formed in the measuring unit body 565. In addition, the measuring unit body 565 is fixed to the upper surface of the upper unit 110 by a second fastening member 583 inserted into the fastening hole.

The body side through hole 566 communicates with the measurement hole 115 of the upper unit 110, and the sensing part 561 and the filter part 564 are positioned in the body side through hole 566. In this case, one surface of the filter part 564 faces the sensing part 561, and the other surface thereof directly faces the roasting chamber 120.

A ventilation hole 567 is formed in the measuring unit body 565 in a direction intersecting a direction in which the body side through hole 566 is formed, and the body side through hole 566 and the ventilation hole 567 intersect each other. In this case, the filter part 564 is spaced apart from the roasting chamber 120 with the ventilation hole 567 interposed therebetween.

The roasting apparatus 1 according to the embodiment of the present disclosure further includes a ventilation part 570 in which one side communicates with the flow tube 311 and the other side communicates with the ventilation hole 567. An air flow introduced into the ventilation hole 567 through the ventilation part 570 is formed on a rear surface (a surface facing the roasting chamber 120) of the filter part 564.

That is, dust generated during the roasting process is suppressed from being introduced into the measurement hole 116 by the guide part 116. When the dust is introduced into the measurement hole 116, the dust is removed due to a flow of the air flowing from the ventilation part 570 to a rear surface of the filter part 564 so that contamination of the filter part 564 can be minimized. In addition, since the air flow generated from the ventilation part 570 to the measurement hole 116 is formed toward the internal space 121 of the roasting chamber 120 through the guide part 116, an inflow of the dust into the measurement hole 116 through the guide part 116 can be minimized.

In addition, by suppressing a formation of a negative pressure from the outside of the guide part 116 to the inside thereof by the ventilation part 570 that forms an airflow from the filter part 564 to the outside of the guide part 116, it is possible to suppress dust generated during the roasting process from being introduced into the filter part 564.

Meanwhile, the ventilation part 570 includes a pipe unit 575 having one side communicating with the flow tube 311, and a plug unit 571 having one side connected to the other side of the pipe unit 575 and having the other side connected to the ventilation hole 567.

The plug unit 571 is formed in a bent shape, and a plug part 573 inserted into the ventilation hole is formed on the other side of the plug unit 571.

The ventilation hole 567 completely passes through one side and the other side of the measuring unit body 565, and a shielding part 584 configured to shield the ventilation hole 567 from the outside is installed on the other side of the ventilation hole 567. Since the ventilation hole 567 is formed to completely pass through, maintenance such as cleaning of the radiant temperature measurement unit 560 may be easily performed.

Meanwhile, emissivity of the filter part 564 of the radiant temperature measurement unit 560, which is an emission amount of energy from a surface of an object during thermal radiation, is differently formed according to a temperature. That is, since the amount of energy of light emitted from the roasting chamber 120 or the object may be varied according to a temperature condition of the filter part 564, there is a need to correct a measured temperature $T_{measure}$ of the sensing part 561 that receives infrared rays through the filter part 564.

Accordingly, the roasting apparatus 1 according to the present embodiment corrects a measured temperature $T_{measure}$ of the roasting chamber 120 or the object, which is measured by the radiant temperature measurement unit 560, on the basis of an outside temperature $T_{outside}$ of the roasting chamber 120 and calculates a real temperature $T_{real}$ of the roasting chamber or the object. The roasting apparatus 1 may further include a controller (not illustrated) for controlling the heat source parts 510, 520, 530, and 540 and receiving data from the temperature measurement unit to calculate the real temperature $T_{real}$.

In this case, the real temperature $T_{real}$ is calculated in consideration of an emissivity change of the filter part on the basis of the outside temperature $T_{outside}$ at the measured temperature $T_{measure}$.

Therefore, the real temperature $T_{real}$ and the measured temperature $T_{measure}$ satisfy the following relational expression.

$$T_{real,k} = \frac{T_{measure,k} - (E_0 + T_{outside,c} \times e) \times T_{outside,k}}{(1 - E_0) - T_{outside,c} \times e} \qquad \text{[Equation 1]}$$

$T_{real,k}$ denotes a corrected real temperature of the object (based on absolute temperature).

$T_{measure,k}$ denotes a measured temperature of the object measured by the sensing part (based on absolute temperature).

$T_{outside,c}$ denotes an outside temperature of the roasting chamber (based on degrees Celsius).

$T_{outside,k}$ denotes an outside temperature of the roasting chamber (based on absolute temperature).

$E_0$ denotes emissivity of the filter part at zero degrees Celsius.

e denotes variance in emissivity per absolute temperature 1 degree (or 1 degree Celsius) of the filter part.

That is, the roasting apparatus 1 according to the embodiment of the present disclosure measures infrared rays emitted from the surface of the roasting chamber 120 or the object and measures the temperature of the roasting chamber 120 or the object so that there is an advantage of being able to measure the temperature more accurately and quickly.

In addition, when a change in the emissivity of the filter part occurs according to a temperature condition, there is an advantage in that a more accurate temperature measurement is possible by correcting the change in the emissivity.

FIG. 14 is a view illustrating an inner configuration of a roasting apparatus according to still another embodiment of the present disclosure.

The present embodiment differs only in a configuration for controlling a preheating operation of the roasting apparatus by measuring a temperature of a chamber outer space of the roasting apparatus, and other configurations of the present embodiment are substantially the same as those of the roasting apparatus shown in FIGS. 1 to 13, and thus hereinafter, a feature portion of the present embodiment will be mainly described.

Referring to FIG. 14, a roasting apparatus 1 according to the embodiment of the present disclosure measures a chamber outer space temperature $T_{outside}$ of the chamber outer space 160 between a roasting chamber part 120 disposed inside the roasting apparatus 1 and a casing unit 190 surrounding the roasting chamber part 120 and forming an outer shape of the roasting apparatus 1 and performs a preheating operation until a measured temperature $T_{measure}$ inside the roasting chamber 121 and a chamber outer space temperature $T_{outside}$ reach a reference chamber inner temperature and a reference chamber outer space temperature, respectively.

When it is determined only whether the measured temperature $T_{measure}$ inside the roasting chamber reaches the reference chamber inner temperature and the roasting apparatus 1 determines whether the preheating operation is terminated, and when the chamber outer space temperature $T_{outside}$ is excessively low or high, during a roasting process after the termination of the preheating operation, there occurs a problem in that roasting quality is degraded due to unintentional heat transfer between the roasting chamber 121 and the chamber outer space 160.

Accordingly, the roasting apparatus 1 according to the present embodiment includes a radiant temperature measurement unit 560 for measuring a temperature of the roasting chamber 120 or the object and a chamber outer space temperature $T_{outside}$ of the chamber outer space 160 between the casing unit 190 and the roasting chamber part 120 on the basis of infrared rays emitted from an inner surface of the roasting chamber part 120 or a surface of the object, which is heated by heat source parts 310, 320, and 330 and determines whether the preheating operation is terminated in consideration of the determination of whether the chamber outer space temperature $T_{outside}$ of the chamber outer space 160 has reached the reference chamber outer space temperature. In this case, the reference chamber outer space temperature is in the range of 55 degrees Celsius to 90 degrees Celsius.

A radiant temperature measurement unit 560 includes a sensing part that measures a temperature of an object on the basis of infrared rays and faces the roasting chamber, an outer space temperature measurement unit configured to measure the chamber outer space temperature of the chamber outer space, and a board on which the sensing part and the outer space temperature measurement unit are mounted.

Meanwhile, the roasting apparatus 1 includes the radiant heat source part 320 that provides radiant heat to the roasting chamber 120, the convection heat source part 310 that provides convection heat to the roasting chamber 120 and includes an flow tube 311 in which an airflow is guided toward the roasting chamber part and a heater unit 312 installed in the flow tube 311, and a conductive heat source part 330 that surrounds at least a portion of an outer circumferential surface of the roasting chamber part 120 and provides conductive heat to the roasting chamber 121 through the roasting chamber part 120.

The radiant heat source part 320 is installed in the upper unit 110 in a state of being disposed inside the roasting chamber 121, and a through-hole configured to allow a portion of light emitted from the radiant heat source part 320 to leak to the chamber outer space 160 is formed in the upper unit 110. That is, the light emitted from the radiant heat source part 320 may be transmitted to the roasting chamber 121 to heat the roasting chamber 121 and/or the object, and the portion of the light may directly leak from the radiant heat source part 320 to the chamber outer space 160 through the through-hole or may be reflected inside the roasting chamber 121 and may leak to the chamber outer space 160 through the through-hole. Due to the leaking light, the chamber outer space 160 may be heated. In addition, heat may be transferred to the chamber outer space 160 from the upper unit 110 heated together due to the heat supplied to the roasting chamber 121.

Hereinafter, a method of controlling the roasting apparatus 1 according to an embodiment of the present disclosure will be described in detail.

FIG. 15 is a view illustrating a method of controlling the roasting apparatus illustrated in FIG. 14.

Referring to FIG. 15, first, a roasting preheating operation starting step (S310) of performing preheating on the roasting chamber 121 of the roasting apparatus 1 is performed.

Thereafter, a preheating condition satisfaction determination step (S320) of determining whether a preheated state of the roasting chamber 121 satisfies a preheating condition is performed. In this case, on the basis of preset temperature profile information, the preheating condition may include whether the measured temperature $T_{measure}$ of the roasting chamber 120 has reached the reference inner temperature and whether the chamber outer space temperature $T_{outside}$ has reached the reference chamber outer space temperature.

In the preheating condition satisfaction determination step (S320), on the basis of the temperature profile information, the roasting apparatus 1 determines whether the measured temperature $T_{measure}$ of the roasting chamber 120 has reached the reference inner temperature and whether the chamber outer space temperature $T_{outside}$ of the roasting chamber 120 has reached the reference chamber outer space temperature.

In the preheating condition satisfaction determination step (S320), when the preheated state of the roasting chamber 121 satisfies the preheating condition, a roasting operation starting step (S330) of starting a roasting operation is performed. Otherwise, in the preheating condition satisfaction determination step (S320), when the preheated state of the roasting chamber 121 does not satisfy the preheating condition, the roasting preheating operation starting step (S310) is performed.

Next, a roasting termination determination step (S340) of determining whether the roasting is terminated is performed.

Next, an additional roasting progress determination step (S350) of determining whether to proceed with additional roasting is performed. In the additional roasting progress determination step (S350), when it is determined that additional roasting is to be performed, the roasting preheating operation starting step (S310) is performed on the basis of the preset roasting profile information. In this case, when the additional roasting is performed, since the roasting chamber is heated by the previous roasting operation, a preheating time may be shortened. Otherwise, in the additional roasting progress determination step (S350), when the additional roasting is not performed, the control is terminated.

According to the proposed embodiments, it is possible to provide a preheating function for the roasting chamber 120, which is capable of further improving the roasting quality.

The above-described system or apparatus may be implemented as a hardware component, a software component, and/or a combination of the hardware component and the software component. For example, the systems, apparatuses, and components described in the embodiments may be implemented using one or more general purpose or special purpose computers including, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. A management device may execute an operating system (OS) and one or more software applications executed on the OS. In addition, in response to the execution of the software, the management device may access, store, manipulate, manage, and generate data. For ease of understanding, although it has been described that one management device is used in some cases, those skilled in the art can see that the management device can include a plurality of management elements and/or a plurality of types of management elements. For example, the management device can include a plurality of processors or one processor and one controller. In addition, the management device can include other processing configurations such as parallel processors.

The software can include computer programs, codes, instructions, or a combination of one or more thereof and configure the management device to operate as desired or command independently or collectively the management device. In order to be interpreted by the management device or provide instructions or data to the management device, the software and/or data can be permanently or temporarily embodied in any kind of machine, a component, a physical device, virtual equipment, a computer storage medium or device, or a transmitted signal wave. The software can be distributed on computer systems connected in a network and stored or executed in a distributed manner. Software and data can be stored in one or more computer-readable recording media.

As described above, although the exemplary embodiments of the present disclosure have been described, the present disclosure is not limited to these embodiments, and various modifications can be practiced within the scope of the appended claims, and the detailed description of the present disclosure, and the accompanying drawings and these modifications also fall within the scope of the present disclosure.

The invention claimed is:

1. A roasting apparatus for heating an object, comprising:
   a roasting chamber part which includes a cylindrical roasting chamber, in which an object is stirred and which extends in a vertical direction, and a rotary stirring part rotated to stir the object accommodated in the roasting chamber, wherein the rotary stirring part is rotated about a stirring axis formed in the vertical direction;
   a casing unit configured to surround the roasting chamber part;
   a heat source part including a first heat source part configured to provide radiant heat to the roasting chamber part; and
   a radiant temperature measurement unit configured to measure a temperature of the roasting chamber or the object and a chamber outer space temperature of a chamber outer space between the casing unit and the roasting chamber part on the basis of infrared rays emitted from an inner surface of the roasting chamber part or a surface of the object, which is heated by the heat source part,
   wherein a preheating operation is performed until the chamber inner temperature of the roasting chamber and the chamber outer space temperature reach a preset reference chamber inner temperature and a preset reference chamber outer space temperature;
   wherein the radiant temperature measurement unit is disposed in an upper unit disposed above the roasting chamber and faces an internal space of the roasting chamber; and
   the radiant temperature measurement unit includes: a sensing part configured to measure the temperature of the object on the basis of the infrared rays and face the roasting chamber; an outer space temperature measurement unit configured to measure the chamber outer space temperature of the chamber outer space; and a board on which the sensing part and the outer space temperature measurement unit are mounted;
   wherein a measured temperature $T_{measure}$ of the roasting chamber or the object, which is measured by the radiant temperature measurement unit, is corrected on the basis of a chamber outer space temperature $T_{outside}$, and then a real temperature of the roasting chamber or the object is calculated;
   a measurement hole is formed to pass through the upper unit and communicates with the roasting chamber; and
   the radiant temperature measurement unit includes: the sensing part configured to measure the temperature of the object on the basis of the infrared rays; a measuring unit body which is disposed on an upper surface of the upper unit and in which a body side through hole communicating with the roasting chamber is formed; the board which is disposed on one side of the measuring unit body and on which the sensing part is mounted; and a filter part which is disposed in front of the sensing part and through which light of a preset wavelength band passes, wherein the body side through hole communicates with the measurement hole, and the sensing part is positioned in the body side through hole, one surface of the filter part faces the sensing part, and the other surface thereof directly faces the roasting chamber, and emissivity of the filter part is varied according to a temperature;

wherein the real temperature $T_{real}$ is calculated in consideration of an emissivity change of the filter part on the basis of an outside temperature $T_{outside}$ at the measured temperature $T_{measure}$; and the real temperature $T_{real}$ and the measured temperature $T_{measure}$ satisfy the following relational expression:

$$T_{real,k} = \frac{T_{measure,k} - (E_0 + T_{outside,c} \times e) \times T_{outside,k}}{(1 - E_0) - T_{outside,c} \times e},$$

wherein $T_{real,k}$ denotes a corrected real temperature of the object (based on absolute temperature), $T_{measure,k}$ denotes a measured temperature of the object measured by the sensing part (based on absolute temperature), $T_{outside,c}$ denotes an outside temperature of the roasting chamber (based on degrees Celsius), $T_{outside,k}$ denotes an outside temperature of the roasting chamber (based on absolute temperature), $E_0$ denotes emissivity of the filter part at zero degrees Celsius, and e denotes variance in emissivity per absolute temperature 1 degree (or 1 degree Celsius) of the filter part.

2. The roasting apparatus of claim 1, wherein:

the first heat source part of the heat source part is installed in the upper unit in a state of being disposed inside the roasting chamber; and a through-hole is formed in the upper unit to allow a portion of light emitted from the first heat source part to leak toward the chamber outer space.

3. The roasting apparatus of claim 2, wherein the heat source part further includes: a second heat source part which provides convection heat to the roasting chamber and includes an inlet tube configured to induce an airflow toward the roasting chamber part and a heater unit installed in the inlet tube; and a third heat source part configured to surround at least a portion of an outer circumferential surface of the roasting chamber part and provide conductive heat to the roasting chamber through the roasting chamber part.

4. The roasting apparatus of claim 1, wherein the reference chamber outer space temperature is in the range of 55 degrees Celsius to 90 degrees Celsius.

5. A roasting apparatus for heating an object, comprising:

a roasting chamber part which includes a cylindrical roasting chamber, in which an object is stirred and which extends in a vertical direction, and a rotary stirring part rotated to stir the object accommodated in the roasting chamber, wherein the rotary stirring part is rotated about a stirring axis formed in the vertical direction;

a heat source part including a first heat source part configured to supply heat to the roasting chamber part and provide hot air to the roasting chamber part to provide convection heat inside the roasting chamber; and a radiant temperature measurement unit configured to measure a temperature of the roasting chamber or the object on the basis of infrared rays emitted from an inner surface of the roasting chamber part or a surface of the object, which is heated by the heat source part;

the first heat source part includes a flow tube through which air flows, and a heating unit disposed on one side of the flow tube and configured to heat the flowing air;

the radiant temperature measurement unit is disposed in an upper unit disposed above the roasting chamber and faces an internal space of the roasting chamber;

a measurement hole is formed to pass through the upper unit and communicates with the roasting chamber; and the radiant temperature measurement unit includes: a sensing part configured to measure the temperature of the object on the basis of the infrared rays; a measuring unit body which is disposed on an upper surface of the upper unit and in which a body side through hole communicating with the roasting chamber is formed; a board which is disposed on one side of the measuring unit body and on which the sensing part is mounted; and a filter part which is disposed in front of the sensing part and through which light of a preset wavelength band passes;

the body side through hole communicates with the measurement hole, and the sensing part is positioned in the body side through hole;

one surface of the filter part faces the sensing part, and the other surface thereof directly faces the roasting chamber;

a ventilation hole is formed in the measuring unit body in a direction intersecting a direction in which the body side through hole is formed, and the body side through hole and the ventilation hole intersect each other;

the roasting apparatus further includes a ventilation part having one side communicating with the flow tube and the other side communicating with the ventilation hole; and an air flow introduced into the ventilation hole through the ventilation part is formed on a rear surface of the filter part.

6. The roasting apparatus of claim 5, wherein:

the ventilation part includes a pipe unit having one side communicating with the flow tube, and a plug unit having one side connected to the other side of the pipe unit and the other side connected to the ventilation hole;

the plug unit is formed in a bent shape; and a plug part inserted into the ventilation hole is formed on the other side of the plug unit.

7. The roasting apparatus of claim 5, wherein:

the ventilation hole completely passes through one side and the other side of the measuring unit body; and a shielding part configured to shield the ventilation hole from the outside is installed on the other side of the ventilation hole.

8. The roasting apparatus of claim 5, wherein:

a cylindrical guide part configured to surround the measurement hole and protrude downward is formed on a lower surface of the upper unit; and the guide part is aligned with the measurement hole.

9. The roasting apparatus of claim 5, wherein:

a measured temperature $T_{measure}$ of the roasting chamber or the object, which is measured by the radiant temperature measurement unit, is corrected on the basis of an outer temperature $T_{outside}$ of the roasting chamber, and then a real temperature of the roasting chamber or the object is calculated; and emissivity of the filter part is varied according to a temperature.

10. The roasting apparatus of claim 9, wherein:

the board is disposed in an outer space of the roasting chamber and includes an outer space temperature measurement unit configured to measure an outer space temperature;

the real temperature $T_{real}$ is calculated in consideration of an emissivity change of the filter part on the basis of an outside temperature $T_{outside}$ at the measured temperature $T_{measure}$; and the real temperature $T_{real}$ and the measured temperature $T_{measure}$ satisfy the following relational expression:

$$T_{real,k} = \frac{T_{measure,k} - (E_0 + T_{outside,c} \times e) \times T_{outside,k}}{(1 - E_0) - T_{outside,c} \times e},$$

wherein $T_{real,k}$ denotes a corrected real temperature of the object (based on absolute temperature), $T_{measure,k}$ denotes a measured temperature of the object measured by the sensing part (based on absolute temperature), $T_{outside}$, denotes an outside temperature of the roasting chamber (based on degrees Celsius), $T_{outside,k}$ denotes an outside temperature of the roasting chamber (based on absolute temperature), $E_0$ denotes emissivity of the filter part at zero degrees Celsius, and e denotes variance in emissivity per absolute temperature 1 degree (or 1 degree Celsius) of the filter part.

11. The roasting apparatus of claim 10, further comprising:

a casing which forms an outer shape, wherein the outer space is disposed between the casing and the roasting chamber.

\* \* \* \* \*